(12) United States Patent
Ida et al.

(10) Patent No.: US 7,708,307 B2
(45) Date of Patent: May 4, 2010

(54) METHOD AND STRUCTURE FOR PROTECTING OCCUPANT

(75) Inventors: Hitoshi Ida, Aichi-ken (JP); Michihisa Asaoka, Aichi-ken (JP); Michio Inoue, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 362 days.

(21) Appl. No.: 11/440,442

(22) Filed: May 25, 2006

(65) Prior Publication Data
US 2006/0267317 A1 Nov. 30, 2006

(30) Foreign Application Priority Data
May 31, 2005 (JP) ............... 2005-160588
Mar. 8, 2006 (JP) ............... 2006-062821

(51) Int. Cl.
B60R 21/207 (2006.01)
(52) U.S. Cl. .................. 280/730.2; 280/730.1
(58) Field of Classification Search .......... 280/730.1, 280/730.2; 297/216.1
See application file for complete search history.

(56) References Cited

U.S. PATENT DOCUMENTS

| 5,722,685 | A | 3/1998 | Eyrainer | |
|---|---|---|---|---|
| 6,349,964 | B1 | 2/2002 | Acker et al. | |
| 7,198,288 | B2* | 4/2007 | Kim et al. | 280/730.2 |
| 7,219,957 | B1* | 5/2007 | Khouri | 297/216.1 |
| 7,338,070 | B2* | 3/2008 | Madasamy et al. | 280/730.2 |
| 7,478,828 | B2* | 1/2009 | Heuschmid et al. | 280/730.2 |
| 2004/0232666 | A1* | 11/2004 | Sato et al. | 280/730.2 |
| 2005/0104342 | A1* | 5/2005 | Jackson et al. | 280/730.2 |
| 2007/0102905 | A1* | 5/2007 | Ryan et al. | 280/730.2 |
| 2008/0061538 | A1* | 3/2008 | Mohammad et al. | 280/730.2 |

FOREIGN PATENT DOCUMENTS

JP A-2003-335210 11/2003

OTHER PUBLICATIONS

Office Action dated Feb. 15, 2008 in corresponding Chinese Patent Application No. 200610078474.3 (and English translation).

* cited by examiner

*Primary Examiner*—Paul N Dickson
*Assistant Examiner*—Drew Brown
(74) *Attorney, Agent, or Firm*—Posz Law Group, PLC

(57) ABSTRACT

A method for protecting an occupant seated on a seat of a vehicle in a side collision of the vehicle is disclosed. In the method, the lumbar region of the occupant is retained in a section that corresponds to the pelvis rearward of the acetabulum in the skeletal structure of the occupant by using an impact absorbing member. Specifically, the lumbar region of the occupant is retained in a section that corresponds to an ilium in the skeletal structure of the occupant. In a side collision of the vehicle, the impact absorbing member initially contacts the lumbar region in a section corresponding to the ilium.

30 Claims, 11 Drawing Sheets

METHOD AND STRUCTURE FOR PROTECTING OCCUPANT

BACKGROUND OF THE INVENTION

The present invention relates to a method and a structure for effectively protecting an occupant on a seat in a vehicle when a side collision occurs.

As a method for protecting an occupant on a seat in a vehicle during a side collision, a method has been known in which a side airbag apparatus disclosed in Japanese Laid-Open Patent Publication No. 2003-335210 is used. This apparatus is configured to protect a side of an occupant when a side collision of a vehicle occurs.

SUMMARY OF THE INVENTION

The present inventors established strategies different than the occupant protection achieved by the side airbag apparatus of the above publication, and diligently carried out research into methods for protecting occupants. They conducted various types of simulations of protection of occupants seated on a vehicle seat during side collisions, while focusing attention on the skeletal structure of occupants. As a result, they found out that an occupant is most effectively protected by restraining the lumbar region of the occupant at a rear portion of the pelvis about the ilium. Based on these findings, the inventors came to achieve the present invention.

Accordingly, it is an objective of the present invention to provide a method and a structure for protecting an occupant that effectively protect an occupant by properly restraining the lumbar region of the occupant.

To achieve the foregoing objectives, one aspect of the present invention provides a method for protecting an occupant seated on a seat of a vehicle in a side collision of the vehicle. The method includes retaining a lumbar region of the occupant in a section that corresponds to a pelvis rearward of an acetabulum in the skeletal structure of the occupant. Particularly, it is preferable to retain the lumbar region of the occupant in a section that corresponds to an ilium in the skeletal structure of the occupant.

Another aspect of the present invention provides a structure for protecting an occupant seated on a seat of a vehicle in a side collision of the vehicle. The structure includes an impact absorbing member located in a passenger compartment for retaining a lumbar region of the occupant seated on the seat. The impact absorbing member is arranged in such a manner as to contact the lumbar region in a section that corresponds to a pelvis rearward of an acetabulum in a side collision of the vehicle. Particularly, it is preferable to arrange the impact absorbing member in such a manner as to contact the lumbar region in a section that corresponds to an ilium in a side collision of the vehicle.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

First Embodiment

A method and a structure for protecting an occupant according to a first embodiment of the present invention will now be described with reference to the attached drawings. In the following, the traveling direction of the vehicle is defined as a forward direction. The backward, upward, downward, leftward, and rightward directions are defined with reference to the forward direction. In the case of seats, the frontward, backward, upward, downward, leftward, and rightward directions are defined to correspond to the directions of the vehicle with reference to the state attached to the vehicle.

Figure 1:
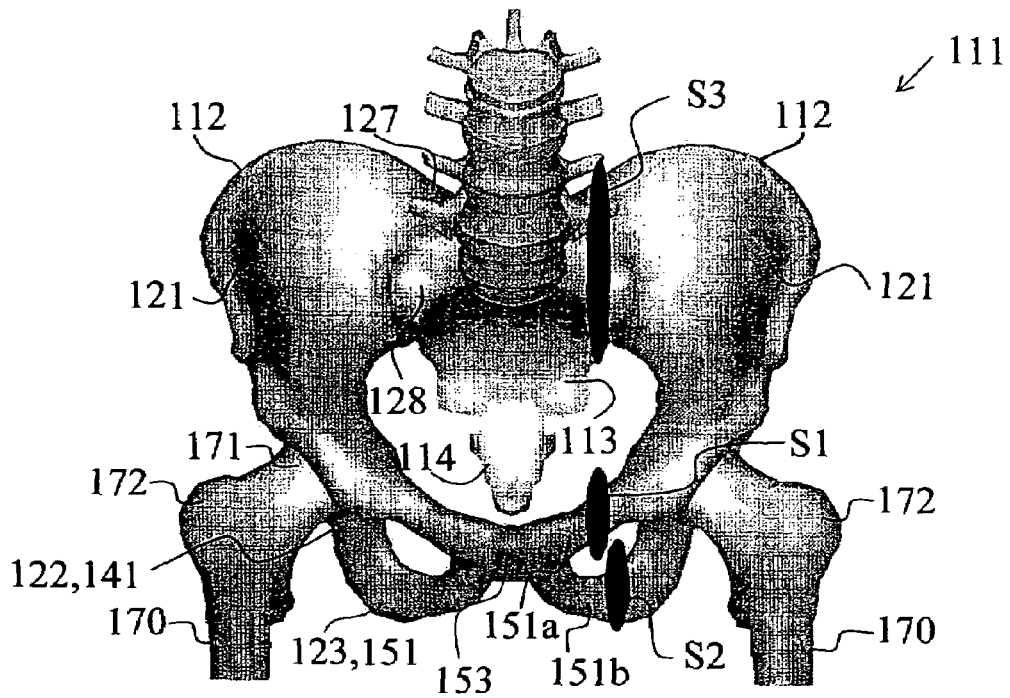
FIG. 1 is a front view illustrating a skeletal structure of the human body in an area including the pelvis.
Figure 2A:
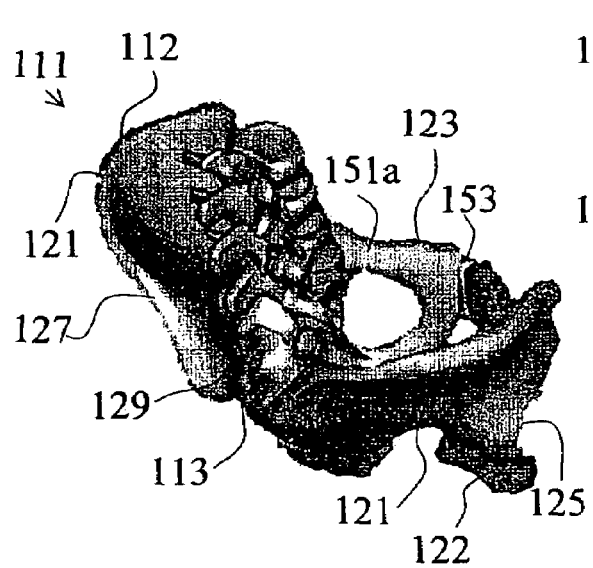
FIG. 2A is a rear perspective view illustrating a skeletal structure of the human body in an area including the pelvis.

FIG. 1 is a perspective view showing the skeletal structure about the pelvis of the human body. FIG. 1 corresponds to a perspective view illustrating the pelvis 111 of an occupant P seated on a vehicle seat 11 (see FIG. 5A) as viewed from the side of a steering wheel 12 (refer to dotted lines in FIG. 5A). FIG. 2A is a rear perspective view illustrating a skeletal structure of the human body in an area including the pelvis 111.

As shown in FIGS. 1 and 2A, the pelvis 111 is an annular bone located between the vertebral column and the lower limbs, and has a tough structure for supporting the weight of the head, the upper limbs, and the torso. The pelvis 111 is stronger and thicker than the walls of cranial cavity or the thoracic cavity, and includes two hip bones forming the sides and front part of the pelvis 111, a sacrum 113 forming the rear wall, and coccyx 114.

The hip bones 112 compose a large part of the pelvis 111. The hip bones 112 are relatively flat and have an irregular shape. Each hip bone 112 is formed by adhering three bones, or an ilium 121, a ischium 122, and a pubis 123. The adhesion occurs in about cup-shaped articulation cavity called an acetabulum 125 (see FIG. 3), to which the caput 171 of a femur 170 is fitted, and at ends of the bones.

Each ilium 121 form a side of the corresponding hip bone 112, and extends upward from the acetabulum 125 in a spreading manner. Each ilium 121 is divided into two portions, or a large wing-shaped ala ossis ilii and a body of ilium 126, which includes a part of the acetabulum 125 (see FIG. 3). An upper front portion of the ala ossis ilii is referred to as an anterior-superior iliac spine, a lower front portion of the ala ossis ilii is referred to as anterior-inferior iliac spine, an upper rear portion of the ala ossis ilii is referred to as a posterior-superior iliac spine 127, and a lower rear portion of the ala ossis ilii is referred to as a posterior-inferior iliac spine. Each ilium 121 is firmly connected to the sacrum 113 at an inner surface referred to as auricular surface 128.

Figure 2B:
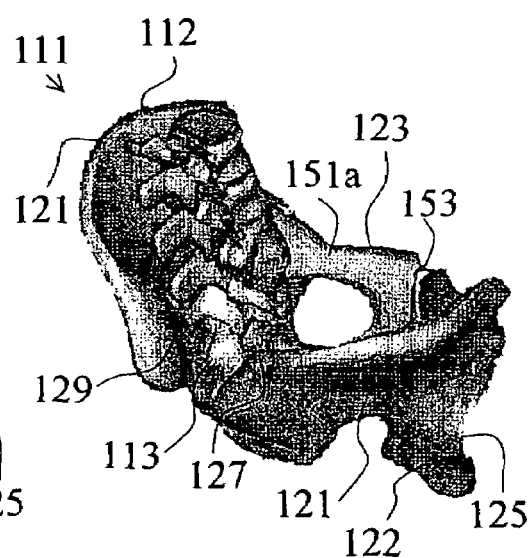
FIG. 2B is a perspective view like FIG. 2A, in which the right ilium when pivoted forward about the articulatio sacroiliaca.

The auricular surface 128 of the sacrum 113 and the auricular surface 128 of the ilium 121 form an articulatio sacroiliaca 129 (see FIG. 2A). At the articular surfaces of the articulatio sacroiliaca 129, a small articular cavity filled with synovial fluid and covered by cartilage is located. Each articulatio sacroiliaca 129 exhibits little mobility and has a characteristic structure with asperities on the articular surfaces. Also, the articulatio sacroiliaca 129 is surrounded by a plurality of strong ligaments. Thus, the articulatio sacroiliaca 129 permits the sacrum 113 and the ilium 121 to move relative to each other in a limited range. That is, each articulatio sacroiliaca 129 permits the corresponding ilium 121 to pivot forward and backward relative to the sacrum 113 as shown in FIGS. 2A and 2B.

Each ischium 122 forms a lower rear portion of the corresponding hip bone 112, and is divided into a body of ischium and a ramus of ischium 141. The body of ischium forms the rear one third of the acetabulum 125. The lower portion of each body of ischium is an ischial tuberosity, and supports the torso of the occupant P when he/she is seated. Each ramus of ischium 141 connects the thin flat ischium to a ramus of pubis 151.

Each pubis 123 has an irregular shape and includes a body of pubis 152 (see FIG. 3) and the ramus of pubis 151. The body of pubis 152 forms the front one third of the corresponding acetabulum 125. The ramus of pubis 151 includes a superior ramus of pubis 151a and an inferior ramus of pubis 151b. Each superior ramus of pubis 151a extends from the body of pubis 152 to the midsagittal plane and forms an articulation with the superior ramus of pubis 151a on the opposite side. The articulation is referred to as a pubic symphysis 153, which includes cartilaginous plates and is thus slightly movable. Each inferior ramus of pubis 151b is connected to the ramus of ischium 141 and forms a bottom arch of an obturator foramen. Like the superior rami of pubis 151a, each inferior ramus of pubis 151b is connected to the other inferior ramus of pubis 151b located at the other side by a pubic symphysis 153.

Figure 3:
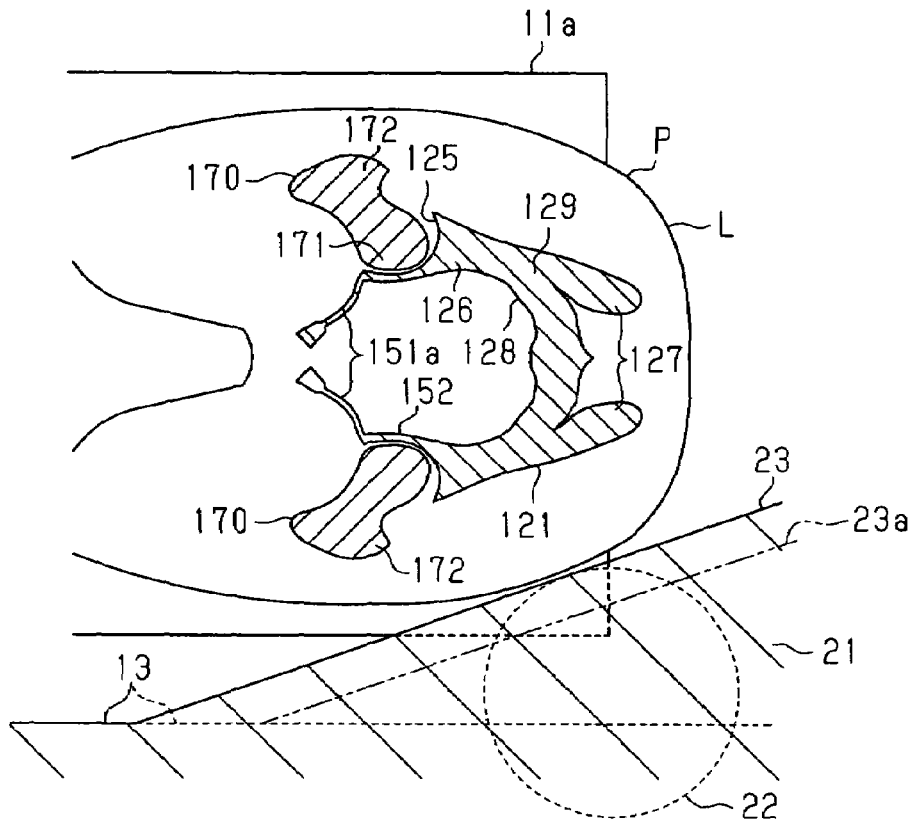
FIG. 3 is a cross-sectional view for explaining one aspect of a first embodiment, diagrammatically showing the lumbar region of an occupant seated on a seat portion of a vehicle seat.

The caput 171 and a greater trochanter 172 exist at an upper end of each femur 170. The greater trochanter 172 laterally extends from the caput 171. As shown in FIG. 1, the distal end of each greater trochanter 172 slightly projects from the corresponding side of the pelvis 111 in the normal state. As shown in FIG. 3, the left and right ilia 121, which are located at the same height as the greater trochanters 172, are tapered to be narrower toward the rear end such that the acetabula 125 are located at the outermost positions, and the posterior-superior iliac spines 127 or posterior inferior iliac spines are located at the innermost positions. That is, in the skeletal structure of the lumbar region at the same height as the greater trochanters 172, the greater trochanters 172 are located at the outermost position of the body.

FIG. 3 is a cross-sectional view diagrammatically showing a lumbar region L of the occupant P when seated on a seat portion 11a of the vehicle seat 11. As shown in FIG. 3, an inner wall 13 (for example, a surface of a door trim or an inner panel) that defines a side of the passenger compartment is located lateral to the seat 11. The inner wall 13 extends in a front-rear direction of the vehicle as the seat 11 and the occupant P.

In the following description of embodiments of the present invention, when only one of a pair or set of any bones is referred to, it indicates one of the pair or the set that is located nearest the side of an airbag, or the side at which a side collision has occurred.

At a side collision of the vehicle, the occupant P receives an inertial force in a vehicle lateral direction, that is, toward the inner wall 13. In the case where another vehicle collides with an outer portion corresponding to the inner wall 13 (an outer surface of the vehicle body, such as a side door), the inner wall 13 can bulge inward toward the occupant P. In such a case, the lumbar region L of the occupant P either directly contacts the inner wall 13 or indirectly contacts the inner wall 13, for example, with a side airbag in between.

The present inventors conducted simulations by computer-aided engineering analysis (CAE analysis) for analyzing the relationship between loads acting on the occupant P seated on the seat 11 and the skeletal structure of the occupant P in a side collision. As a result, in the case of a prior art in which the lumbar region L of an occupant P contacts an inner wall 13 at a right angle (in the case where the lumbar region L of the occupant P contacts the inner wall 13 at a plane parallel to the inner wall 13 shown by dotted line in FIG. 3), the load transmitted to the occupant P from the inner wall 13 showed a characteristic uneven distribution in the skeletal structure of the occupant P. Particularly, a tendency was observed that an initial load on the greater trochanter 172 located at an outer portion of the body of the occupant P directly concentrated onto the pubis 123, which had a small cross-sectional area. Therefore, it is preferable to widely and evenly disperse such an application of load over time and space as much as possible, or to concentrate the distribution of load to a section that has a high resistance against load.

As shown in FIG. 1, each pubis 123, which includes the superior ramus of pubis 151a and the inferior ramus of pubis 151b, is located inside the corresponding greater trochanter 172 and extends substantially in the vehicle lateral direction. On the rear side of the pelvis 111, the auricular surfaces 128 of the corresponding ilia 121, which extend substantially along the vehicle lateral direction, are located. Each section that includes one of the auricular surfaces 128 has the smallest cross-sectional area among the bones extending along the vehicle lateral direction in the rear portion of the pelvis 111. However, the sum of the cross-sectional area S1 of each superior ramus of pubis 151a and the cross-sectional area S2 of the corresponding inferior ramus of pubis 151b is only approximately one third of the cross-sectional area of the corresponding ilium 121 in the vicinity of the auricular surface 128.

Figure 4A:
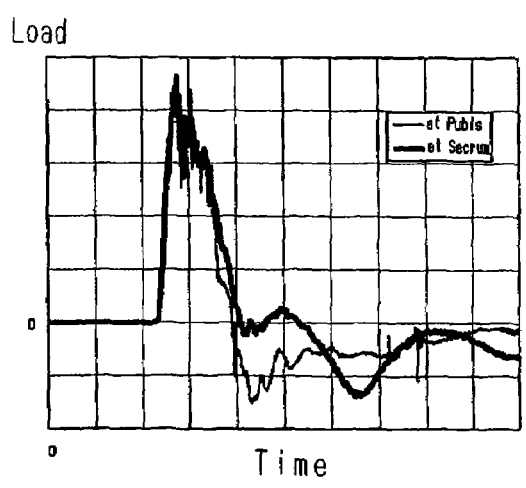
FIG. 4A is a graph showing changes of a load over time when the same load is applied to a front portion of the pelvis (pubis) and a rear portion of the pelvis (sacrum) in simulations of the relationship between a load applied to an occupant seated on a seat and the skeletal structure of the occupant.
Figure 4B:
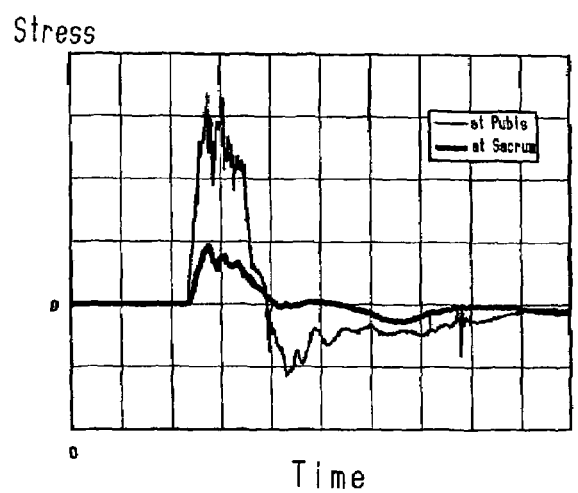
FIG. 4B is a graph showing changes over time of a stress generated in the pelvis in the simulations performed applying the load shown in FIG. 4A.

The present inventors conducted simulations of changes in the stress in the pelvis 111 in a case where the loads shown in FIG. 4A were applied to the pelvis 111 through the CAE analysis. FIG. 4A is a graph showing simulations of changes in loads applied to the pelvis 111 when equal loads were applied to a front portion (pubis) and a rear portion (sacrum) of the pelvis 111. FIG. 4B is a graph showing changes in stress in the pelvis 111 over time.

Although the equal loads were applied, the stress in the front portion (pubis) of the pelvis 111 was greater than the stress in the rear portion (sacrum). According to the results of CAE analysis under a specific condition (for example, in a case where the occupant P was assumed to have an average body size of an American male), the stress in the front portion of the pelvis 111 (pubis) is approximately three times greater than the stress in the rear portion (sacrum), as being inversely proportional to the difference between the cross-sectional area of the front portion of the pelvis 111 (pubis) and the rear portion (sacrum). That is, in view of effectively protecting the occupant P, it is not desirable to apply a great load to the pubis 123 through the greater trochanter 172 in the lumbar region L of the occupant P because the stress is significantly concentrated. Load applied to the front portion of the pelvis 111 (pubis) is preferably less than load applied to the rear portion (sacrum). Under the specific condition shown above, it is most preferable that load applied to the front portion of the pelvis 111 (pubis) is approximately one third of load applied to the rear portion (sacrum).

To achieve such desirable application of load, an impact absorbing member 21 is located lateral to the lumbar region L of the occupant P seated on the vehicle seat 11 as shown in FIG. 3 in this embodiment. The impact absorbing member 21 includes an inclined surface 23 that is supported by a member having an impact absorbing performance, such as a soft resin member made of, for example, thermoplastic elastomer, a resin foam member made of, for example, urethane foam, and an airbag 22. The inclined surface 23 itself may be formed of the soft resin or resin foam.

On a side of the lumbar region L of the occupant P, the inclined surface 23 is arranged as to contact the lumbar region L (buttocks) of the occupant P in a rear portion of the pelvis 111 about the ilium 121, specifically, in a section that corresponds to the pelvis 111 rearward of the acetabulum 125. The section that corresponds to a portion of the pelvis 111 rearward of the acetabula 125 does not include the acetabula 125. Further, the inclined surface 23 is preferably arranged to contact the lumbar region L of the occupant P at the side of the ilium 121, the sacrum 113, and the ischium 122, and particularly preferably arranged to contact the lumbar region L of the occupant P in a section corresponding to the ilium 121. Also, the inclined surface 23 extends preferably along a rear portion of the pelvis 111 about the ilium 121, specifically along the pelvis 111 rearward of the acetabulum 125, and particularly preferably along the ilium 121.

In one aspect of the first embodiment, the inclined surface 23 is formed as a plane that is inclined relative to the inner wall 13 by a predetermined angle such that the inclined surface 23 protrudes further into the passenger compartment as it approaches the rear end. To permit a load to be received by bones in a wide range, the inclined surface 23 of this aspect of the first embodiment is formed to be parallel to a plane that includes, for example, at least three points in the anterior-superior iliac spine, the posterior-superior iliac spine 127, the anterior-inferior iliac spine, and the posterior-inferior iliac spine, and is preferably formed to be parallel to a plane that includes a section close to the anterior-superior iliac spine, a section close to the posterior-superior iliac spine 127, a section close to the anterior-inferior iliac spine, and a section close to the posterior-inferior iliac spine.

In another aspect of the first embodiment, the inclined surface 23 is formed to be a curved surface that extends along an outer surface of the ilium 121, which substantially has an bowl like shape. In this aspect of the first embodiment, the inclined surface 23 is, for example, shaped to protrude further into the passenger compartment as it approaches the rear end, and has a concaved central portion. Further, in this aspect of the first embodiment, the inclined surface 23 is preferably shaped to protrude further into the passenger compartment as it approaches the lower end, and has a concaved central portion.

Prior to a side collision of the vehicle, the inclined surface 23 of this aspect of the first embodiment does not project into the passenger compartment, but is located in a position of the inner wall 13 shown by dotted lines in FIG. 3. When a side collision of the vehicle occurs, the inclined surface 23 projects into the passenger compartment from the inner wall 13, and contacts the lumbar region L (buttocks) of the occupant P. Also, like an inclined surface 23a shown by an alternate long and two short dashes line in FIG. 3, the inclined surface 23 is located in the position of the inner wall 13 shown by the dotted line in FIG. 3. When a side collision of the vehicle occurs, the inclined surface 23 projects into the passenger compartment from the inner wall 13, and contacts the lumbar region L (buttocks) of the occupant P. If the inclined surface 23a is arranged to contact the lumbar region L of the occupant P, the inclined surface 23a and the lumbar region L of the occupant P may be spaced from each other by a certain distance as indicated by alternate long and two short dashes line in FIG. 3.

It may be configured such that, prior to a side collision of the vehicle, the inclined surface 23a projects into the passenger compartment (position indicated by alternate long and two short dashes line in FIG. 3), and contacts the lumbar region L of the occupant P. Further, it may be configured such that the inclined surface 23a projects to a position shown by solid line in FIG. 3 when a side collision of the vehicle occurs. The impact absorbing member 21 having the inclined surfaces 23, 23a can be provided in a side of the seat portion 11a or the backrest 11b of the seat 11, or in the inner wall 13 such as the door trim or the inner panel.

Figure 5A:
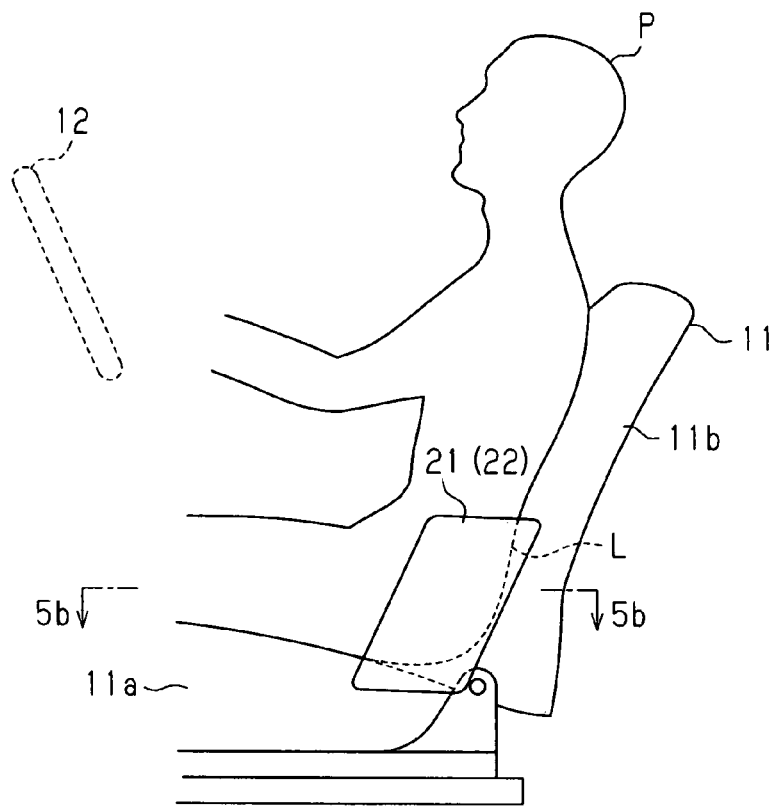
FIG. 5A is a side view of an occupant seated on a vehicle seat for explaining one aspect of the first embodiment.
Figure 5B:
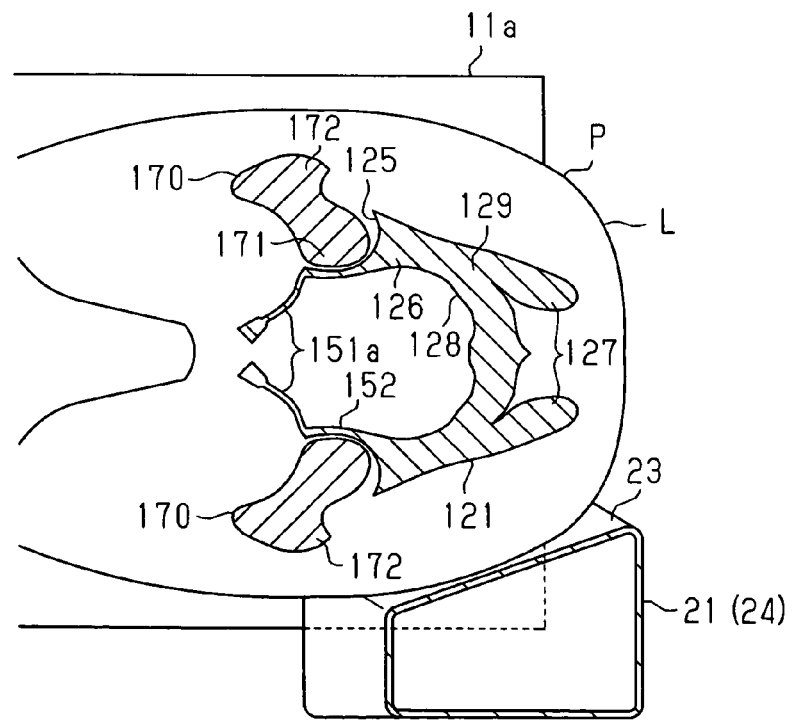
FIG. 5B is a cross-sectional view taken along line 5B-5B of FIG. 5A.

For example, FIGS. 5A and 5B schematically shows an impact absorbing member 21 including an airbag 22 with a seat back. Before a side collision of the vehicle occurs, the impact absorbing member 21 is accommodated in the backrest 11b of the seat 11. When a side collision occurs, the impact absorbing member 21 is deployed forward from the side of the backrest 11b, so that the inclined surface 23 contacts the lumbar region L (buttocks) of the occupant P. The inclined surface 23 of the impact absorbing member 21 is arranged to be inclined relative to the inner wall 13 by a predetermined angle such that the inclined surface 23 protrudes further into the passenger compartment as it approaches the rear end. Further, the inclined surface 23 is shaped to protrude further into the passenger compartment as it approaches the lower end.

In FIG. 5B, for illustration purposes, the shape of the impact absorbing member 21 is simplified, and the inclined surface 23 is illustrated as a flat surface. However, the impact absorbing member 21 of the airbag 22 may be formed to bulge in a center of the inclined surface 23 with respect to the traveling and/or vertical direction of the vehicle. In this case, at least part of the inclined surface 23, preferably a center of the inclined surface 23, contacts a rear portion of the pelvis 111 about the ilium 121 in the skeletal structure of the occupant P. The inclined surface 23 of this aspect of the first embodiment may be concaved in a center with respect to the traveling direction and/or the vertical direction so that the inclined surface 23 conforms to the shape of the lumbar region L (buttocks) of the occupant P.

In an aspect of the first embodiment different from the above described airbag 22 with the seat back, the impact absorbing member 21 may be an airbag 22 with a seat cushion or an airbag 22 with a door trim. Before a side collision of the vehicle occurs, the impact absorbing member 21 comprising the airbag 22 attached to a seat cushion is accommodated in the seat portion 11a of the seat 11. When a side collision occurs, the impact absorbing member 21 is deployed substantially upward from the side of the seat portion 11a, so that the inclined surface 23 contacts the lumbar region L (buttocks) of the occupant P. Before a side collision of the vehicle occurs, the impact absorbing member 21 comprising the airbag 22 attached to a door trim is accommodated in the back of the inner wall 13 (between the inner wall 13 and the outer side of the vehicle body such as a side door). When a side collision occurs, the impact absorbing member 21 is deployed into the passenger compartment (in a lateral direction of the vehicle), so that the inclined surface 23 contacts the lumbar region L (buttocks) of the occupant P.

Figure 6A:
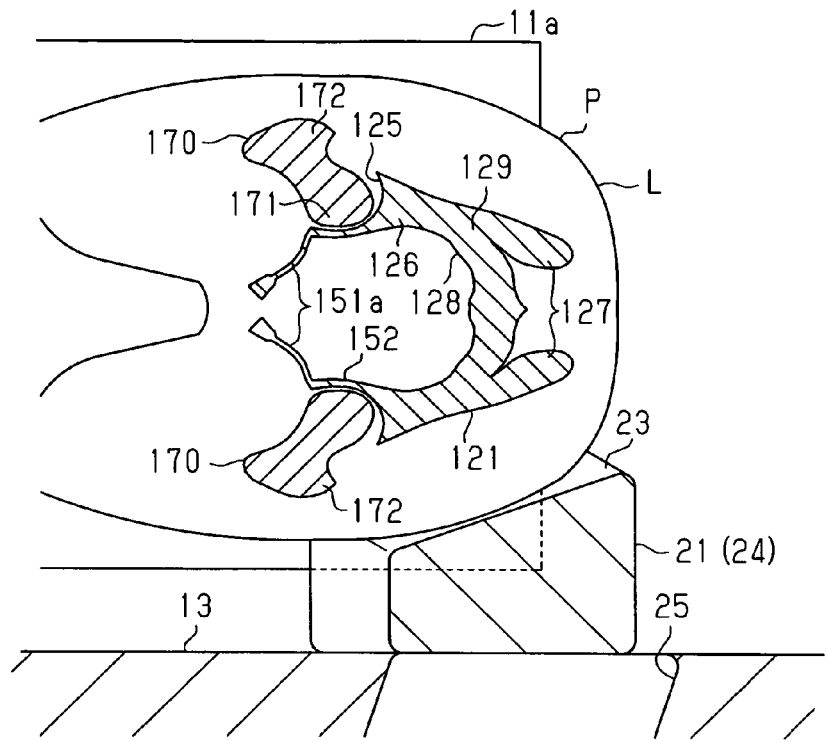
FIG. 6A is a cross-sectional view of the lumbar region of an occupant seated on a vehicle seat for explaining another aspect of the first embodiment.

As schematically shown in FIG. 6A, an impact absorbing member 21 of another aspect of the first embodiment is accommodated in an impact absorbing pad 24 attached to the inner wall 13. The impact absorbing pad 24 is substantially shaped as a quadrangular prism, and is formed of a soft resin or a resin foam. Before a side collision of the vehicle occurs, the impact absorbing pad 24 is accommodated in a recess 25 formed in the inner wall 13 to be flush with the inner wall 13. When a side collision occurs, the impact absorbing pad 24 is deployed into the passenger compartment (in a lateral direction of the vehicle), so that the inclined surface 23 contacts the lumbar region L (buttocks) of the occupant P.

Figure 6B:
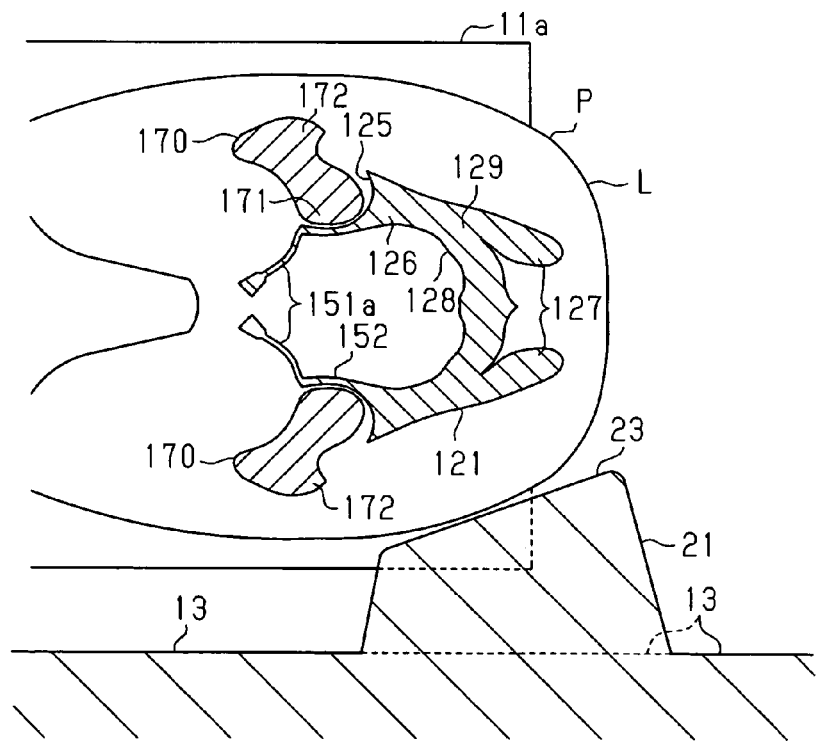
FIG. 6B is a cross-sectional view of the lumbar region of an occupant seated on a vehicle seat for explaining yet another aspect of the first embodiment.

As schematically shown in FIG. 6B, an impact absorbing member 21 of another aspect of the first embodiment is formed by a part of the inner wall 13. The impact absorbing member 21 of this aspect of the first embodiment is a modification of the impact absorbing member 21 shown in FIG. 3. That is, in this aspect of the first embodiment, an inclined surface 23 is formed such that, when a side collision of the vehicle occurs, only a part of the inner wall 13 is caused to project into the passenger compartment (in a lateral direction of the vehicle) and contacts the lumbar region (buttocks) L of the occupant P. Before a side collision occurs, the inclined surface 23 does not project into passenger compartment, but is located in a position shown by dotted line. That is, the inclined surface 23 extends in the front-rear direction of the vehicle to be flush with the inner wall 13.

The inclined surfaces 23, 23a contacts the lumbar region L of the occupant P (particularly, a center section of the gluteus maximus) when a side collision occurs, and pushes the lumbar region L into the passenger compartment, thereby restraining the lumbar region L. That is, the inclined surfaces 23, 23a prevent the lumbar region L from being moved outward from the inclined surface 23, 23a. At this time, the inclined surfaces 23, 23a restrains the lumbar region L of the occupant P at a rear portion of the pelvis 111 about the ilium 121 in the skeletal structure of the occupant P seated on the vehicle seat 11, thereby reliably protecting the occupant P.

As described above, a rear portion of the pelvis 111 about the ilium 121 has a stronger skeletal structure against loads in a vehicle lateral direction than a portion corresponding to the greater trochanter 172. Further, in this case, the rear portion of the pelvis 111 is covered with the thickest section of the gluteus maximus. Thus, before the load is transmitted to the ilium 121, the gluteus maximus exerts a high impact absorbing performance. Therefore, for example, under the above described specific condition, when the inclined surface 23, 23a contacts and restrains the lumbar region of the occupant P at a rear portion of the pelvis 111 about the ilium 121, the skeletal structure is presumed to bear a load that is three times or more than in the case where a load is applied an area corresponding to the greater trochanter 172. Therefore, the occupant protecting performance is further improved.

In most of the cases in which the inclined surfaces 23, 23a contact the lumbar region L of the occupant P at a rear portion of the pelvis 111 about the ilium 121, a rear portion of the pelvis 111 about the ilium 121, or the buttocks, in the lumbar region L first contacts the inclined surface 23, 23a. At this time, compared to the case where the inclined surfaces 23, 23a first contact a portion corresponding to the greater trochanter 172, the load applied to the pubis 123 is significantly reduced. It is thus possible to improve the occupant protecting performance.

In the case where the inclined surfaces 23, 23a contacts the lumbar region L of the occupant P at a rear portion of the pelvis 111 about the ilium 121, the impact absorbing member 21 including the inclined surfaces 23, 23a contacts the lumbar region L from diagonally behind the occupant P. At this time, the inclined surfaces 23, 23a are capable of simultaneously applying load in a wide range in the outer surface of the rear portion of the pelvis 111 about the ilium 121. As a result, since the load is applied to the rear portion of the pelvis 111 in a spread manner, the occupant protecting performance is improved. In this embodiment, the inclined surfaces 23, 23a of the impact absorbing member 21 contact the lumbar region L of the occupant P in a state inclined to protrude further into the passenger compartment as it approaches the rear end. The inclined surfaces 23, 23a easily contact the lumbar region L from diagonally behind the occupant P.

Further, the present inventors conducted simulations by CAE analysis for finding out the most effective part of the rear portion of the pelvis 111 about the ilium 121 to receive a concentrated load for protecting the occupant P. The results of the simulations showed that, when the inclined surfaces 23, 23a contacted a top end of the ilium 121 (ala ossis ilii located higher than the auricular surface 128), the load transmitted from the inclined surface 23, 23a to the occupant P showed a characteristic uneven distribution in the skeletal structure of the occupant P. That is, the load transmitted to the inclined surface 23, 23a generated a rotation moment with the articulatio sacroiliaca 129 as a fulcrum and the ilium 121 as a point of application of force, to rotate the ilium 121 forward about the articulatio sacroiliaca 129 with respect to the sacrum 113. The rotation moment acts from the front end of the ilium 121 to the pubis 123, but does not acts in a direction corresponding to motion of the pubis 123 about the pubic symphysis 153. Therefore, the rotation moment is converted into a bending moment acting on the pubis 123 having a small cross-sectional area, and is directly concentrated onto the pubis 123. Therefore, it is preferable that the distribution of such load be selectively concentrated on a portion having a high resistance.

In this respect, the inclined surfaces 23, 23a of this embodiment are preferably arranged in positions at which the surfaces 23, 23a contact the lumbar region L of the occupant P at a portion lower than the articulatio sacroiliaca 129 (the auricular surface 128) with respect to the vertical direction of the pelvis 111 of the occupant P seated on the seat 11. Specifically, in one aspect of the first embodiment, the inclined surfaces 23, 23a are arranged to contact the lumbar region L of the occupant P on a side of a section of the ilium 121 that is lower than the ischium 122, the sacrum 113, and the articulatio sacroiliaca 129 (that is, the body of ilium 126). In this case, the inclined surfaces 23, 23a needs to be arranged to contact the lumbar region L of the occupant P at a portion of the pelvis 111 rearward of the acetabulum 125 with respect to the front-rear direction of the pelvis 111 of the occupant P seated on the seat 11.

Further, the inclined surface 23, 23a is preferably arranged to apply load to the articulatio sacroiliaca 129. Specifically, in one aspect of the first embodiment, the inclined surfaces 23, 23a are arranged diagonally behind and slightly lower than the ilium 121. The inclined surfaces 23, 23a are flat surfaces perpendicular to the direction from the position of the surfaces 23, 23a to the articulatio sacroiliaca 129. In anther aspect of the first embodiment, the inclined surfaces 23, 23a are arranged diagonally behind and slightly lower than the ilium 121, and are bowl-like curved surfaces surrounding the articulatio sacroiliaca 129 at an equal distance. In this aspect of the first embodiment, the inclined surface 23, 23a are capable of applying load to the articulatio sacroiliaca 129 from diagonally behind and slightly below the ilium 121 in the skeletal structure of the occupant P.

The first embodiment provides the following advantages.

(1) The method for protecting an occupant according to the present embodiment is characterized in that, when a side collision of the vehicle occurs, the lumbar region L of the occupant P is restrained at a rear portion of the pelvis 111 about the ilium 121 in the skeletal structure of the occupant P seated on the vehicle seat 11. According to this protecting method, the occupant P is effectively protected by properly restraining the lumbar region L of the occupant P.

That is, when a side collision of the vehicle occurs and the occupant P receives an inertial force in the vehicle lateral direction, the lumbar region L of the occupant P moves toward the inner wall 13 forming a side of the passenger compartment, for example, a door trim and in inner panel. Also, in some cases of side collision of the vehicle, the inner wall 13 moves toward the lumbar region L of the occupant P. When the lumbar region L of the occupant P contacts the inner wall 13 and pushed into the passenger compartment, that is, when the lumbar region L is restrained so that the lumbar region L does not move outward of the inner wall 13, the lumbar region L of the occupant P receives a load that corresponds to the pushing force applied by the inner wall 13.

In the occupant P seated on the vehicle seat 11, the greater trochanter 172 projecting outward at the upper end of the femur 170 and the pubis 123 forming the front surface of the pelvis 111 are located in a front portion of the lumbar region L, and extend along the lateral direction of the vehicle. Also, in a rear portion of the lumbar region L, a part of the ilium 121 (for example, the auricular surface 128) forming the rear surface of the pelvis 111 is arranged to extend in the lateral direction of the vehicle. The distal end of the greater trochanter 172 project outward relative to the side edge of the ilium 121. The minimum value of the cross-sectional area of the pubis 123 extending in the vehicle lateral direction is only about one third of the minimum value of the cross-sectional area of the ilium 121 extending in the same direction.

Therefore, when a side of the lumbar region L of the occupant P is pressed against the inner wall 13, the skeletal structure bears a greater load when receiving the load at a rear portion of the pelvis 111 about the ilium 121 than when receiving the load in a section corresponding to the greater trochanter 172. That is, when a load is applied to a rear portion of the pelvis 111, the load is received in a large area in a spread manner compared to a case where the load is received by a section corresponding to the greater trochanter 172. Therefore, when load of the same magnitude is applied, the magnitude of the load applied to a unit area is less in the ilium 121 than in the pubis 123 with respect to a cross-section of a bone perpendicular to the direction of the application of the load. Therefore, the ilium 121 receives the load with a lower stress.

Therefore, according to the protecting method of this embodiment, when a side collision of the vehicle occurs, the lumbar region L of the occupant P is restrained at a rear portion of the pelvis 111 about the ilium 121 in the skeletal structure of the occupant P seated on the vehicle seat 11. Therefore, compared to the case where the lumbar region L is restrained in a front portion, the load applied to the lumbar region L of the occupant P in a side collision can be received with a lower stress. Thus, the lumbar region L of the occupant P is properly restrained by a method suitable for the skeletal structure of the lumbar region L, and the occupant P is effectively protected.

(2) The protecting method of this embodiment is carried out by using the impact absorbing member 21 for restraining the lumbar region L of the occupant P. When a side collision of the vehicle occurs, the impact absorbing member 21 contacts the lumbar region L to conform to the pelvis 111 in a section rearward of the acetabulum 125. Therefore, load applied to the occupant P in a side collision of the vehicle is received by a large area in a rear portion of the pelvis 111. This improves the occupant protecting performance.

(3) The protecting method of this embodiment is carried out by using the impact absorbing member 21 for restraining the lumbar region L of the occupant P. When a side collision of the vehicle occurs, the impact absorbing member 21 first contacts the lumbar region L of the occupant P at a section corresponding to ilium 121. Therefore, compared to the case where the impact absorbing member 21 first contacts the lumbar region L of the occupant P at a portion corresponding to the greater trochanter 172, the load applied to the pubis 123 is significantly reduced. It is thus possible to improve the occupant protecting performance.

(4) The protecting method of this embodiment is carried out by using the impact absorbing member 21 for restraining the lumbar region L of the occupant P. When a side collision of the vehicle occurs, the impact absorbing member 21 contacts the lumbar region L from diagonally behind the occupant P. The protecting method of this embodiment is carried out by using the impact absorbing member 21 for restraining the lumbar region L of the occupant P. When a side collision of the vehicle occurs, the impact absorbing member 21 contacts the lumbar region L while being inclined to project further into the passenger compartment as it approaches the rear end. When this protecting method is applied, the lumbar region L of the occupant P receives load from the impact absorbing member 21 in a wide area in an outside surface of the rear portion of the pelvis 111 about the ilium 121. As a result, since the load is applied to the rear portion of the pelvis 111 in a spread manner about the ilium 121, the occupant protecting performance is improved.

(5) In the protecting structure of this embodiment, load applied to the occupant P in a side collision of the vehicle is transmitted to the articulatio sacroiliaca 129 of the occupant. Each ilium 121 is coupled to the sacrum 113 to be slightly pivotable forward and backward about the corresponding articulatio sacroiliaca 129. On the other hand, the pubes 123 are connected to be slightly pivotable about the pubic symphysis 153. That is, taking the pelvis 111 as a whole, when the ilium 121 pivots forward or backward relative to the sacrum 113 about the articulatio sacroiliaca 129, a rotation moment having the ilium 121 as a point of application of force is generated. The rotation moment acts from the front end of the ilium 121 to the pubis 123, but does not acts in a direction corresponding to motion of the pubis 123 about the pubic symphysis 153. Therefore, the rotation moment is converted into a bending moment acting on the pubis 123.

According to the protecting method of this embodiment, most of the load applied to the occupant P in a side collision is transmitted to the articulatio sacroiliaca 129, and the load applied in a direction rotating the ilium 121 is significantly reduced. This greatly suppresses the generation of rotation moment having the ilium 121 as a point of application of force, and thus significantly reduces the bending moment applied to the pubis 123. Thus, in a side collision of the vehicle, the load applied to a rear portion of the pelvis 111 about the ilium 121 is scarcely transmitted to the pubis 123, but is received by the sacrum 113, which has a larger cross-sectional area than the pubis 123. The occupant P is therefore effectively protected.

(6) The protecting structure of this embodiment is configured to reduce a load component transmitted to the greater trochanter 172 in load applied to the occupant P in a side collision of the vehicle is reduced. Therefore, in the load applied to the occupant P in a side collision of the vehicle, a component transmitted to the greater trochanter 172 of the occupant P is reduced. The load transmitted to the pubis 123 through the greater trochanter 172 is easily reduced. The occupant P is therefore effectively protected.

(7) In the occupant protecting structure of this embodiment, the impact absorbing member 21 is provided in the passenger compartment to restrain the lumbar region L of the occupant P seated on the vehicle seat 11. The impact absorbing member 21 is arranged to contact the lumbar region L of the occupant P at a rear portion of the pelvis 111 about the ilium 121 in the skeletal structure of the occupant P at least in a side collision of the vehicle. Thus, according to the protecting structure, the impact absorbing member 21 contacts the lumbar region L of the occupant P at a rear portion of the pelvis 111 about the ilium 121 of the occupant P. Therefore, compared to the case where the impact absorbing member 21 contacts a front portion of the lumbar region L, the load applied to the lumbar region L of the occupant P in a side collision can be received with a lower stress. Thus, the lumbar region L of the occupant P is properly restrained by the structure suitable for the skeletal structure of the lumbar region L, and the occupant P is effectively protected.

(8) In one aspect of the protecting structure of this embodiment, the impact absorbing member 21 is configured to project into the passenger compartment from the vehicle body in a side collision of the vehicle. Since the impact absorbing member 21 does not project into the passenger compartment before a side collision, the space of the passenger compartment can be enlarged. As a result, the comfort of the passenger compartment is improved, and getting in and getting out of the vehicle are facilitated. Since the impact absorbing member 21 has the airbag 22, the impact absorbing member 21 is capable of projecting quickly by deploying the airbag 22, and the impact absorbing member 21 can be accommodated in the vehicle body in a compact manner.

(9) In one aspect of the protecting structure of this embodiment, the impact absorbing member 21 is configured to always project into the passenger compartment from the vehicle body. Since the impact absorbing member 21 projects into the passenger compartment before a side collision occurs, the structure for causing the impact absorbing member 21 to project is omitted unlike the case where the impact absorbing member 21 is caused to project into the passenger compartment when a side collision occurs. This simplifies the structure.

(10) In one aspect of the protecting structure of this embodiment, the impact absorbing member 21 is provided in the seat portion 11a or the backrest 11b of the seat 11. In this case, the relative positions and contacting angle of the impact absorbing member 21 and the lumbar region L of the occupant P can be easily optimized. Particularly, this aspect is advantageous since, when the position of the seat 11 in the front-rear direction or the height of the seat 11 is adjusted, the relative positions are maintained.

(11) In one aspect of the protecting structure of this embodiment, the impact absorbing member 21 is provided in the door trim or the inner panel of the vehicle. In this case, a large space for accommodating the impact absorbing member 21 is easily secured.

Second Embodiment

A second embodiment of the present invention will now be described. Like or the same reference numerals are given to those components that are like or the same as the corresponding components of the first embodiment, and detailed explanations and drawings are omitted or simplified.

Figure 7:
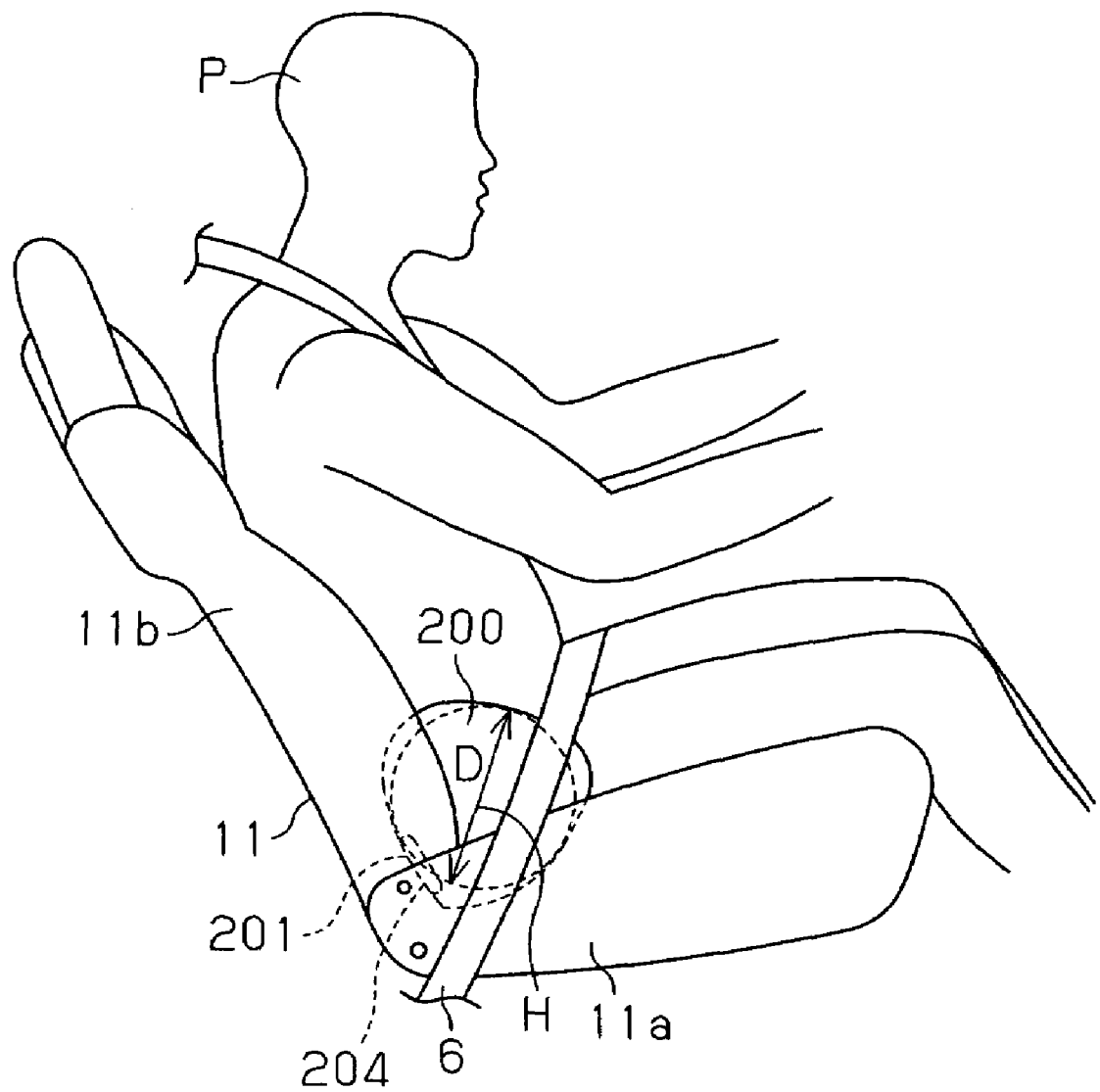
FIG. 7 is a side view illustrating an occupant seated on a vehicle seat for explaining a second embodiment.

FIG. 7 schematically shows a lumbar region airbag 200 functioning as an impact absorbing member 21. As shown in FIG. 7, a seat 11 located in a passenger compartment of a vehicle (not shown) includes a seat portion 11a for supporting the buttocks and the thighs of an occupant P, a reclining backrest 11b, and a seat belt 6. As shown in FIG. 8, the backrest 11b includes a pair of seat back frames 31 in lateral ends. The seat back frames 31 are formed like flat plates and extend vertically. The backrest 11b also includes a cushion member 32, which completely covers the seat back frames 31. The backrest 11b has a seat skin 34 for covering the entire cushion member 32. The seat belt 6 is a three-point seat belt that restrains an occupant P seated on the seat 11. As shown in FIG. 8, the side portions of the cushion member 32 project forward than the central portion. A seam 35 is provided at the front end of each side projection of the cushion member 32. The seat skin 34 is seamed at the seams 35.

An airbag apparatus 201 having the airbag 200 is accommodated in the backrest 11b of the seat 11. In a side collision of the vehicle, the airbag 200 is deployed and inflated forward from the backrest 11b, so that a pressing surface Pa contacts the lumbar region L (buttocks) of the occupant P. Specifically, the airbag apparatus 201 is accommodated in a case (not shown) and is embedded in the cushion member 32. The airbag apparatus 201 is located adjacent to the right (outer side of the vehicle) of the seat back frame 31 of the backrest 11b to correspond to the door 10 (see FIG. 8), which forms a side portion of the vehicle body. More specifically, the airbag apparatus 201 is fixed to an inner surface 31a of the seat back frame 31 (a side opposite to a surface 31b facing the door 10). Although only the right seat 11 is illustrated in the drawings, a left seat has a similar airbag apparatus in its left portion. The airbag apparatus 201 is fixed to a lower portion of the seat back frame 31 (proximal end of the seat back frame 31, on the side of the seat portion 11a, shown by broken line in FIG. 7).

As shown in FIG. 8, the airbag apparatus 201 has a cylindrical retainer 203, a gas generator, and an airbag 200 (an impact absorbing member 21). The gas generator is a cylindrical inflator 204 located in the retainer 203 in this embodiment. The airbag 200 covers the retainer 203 and the inflator 204. Prior to inflation (deployment), the airbag 200 is accommodated in the case in a state held between the retainer 203 and the casing. The inflator 204 accommodates gas generating agent for deploying and inflating the airbag 200. The inflator 204 has gas ports for discharging gas generated by the gas generating agent. The inflator 204 is electrically connected to a collision detector, or a sensor, for detecting a collision on a side of the vehicle body.

Figure 8A:
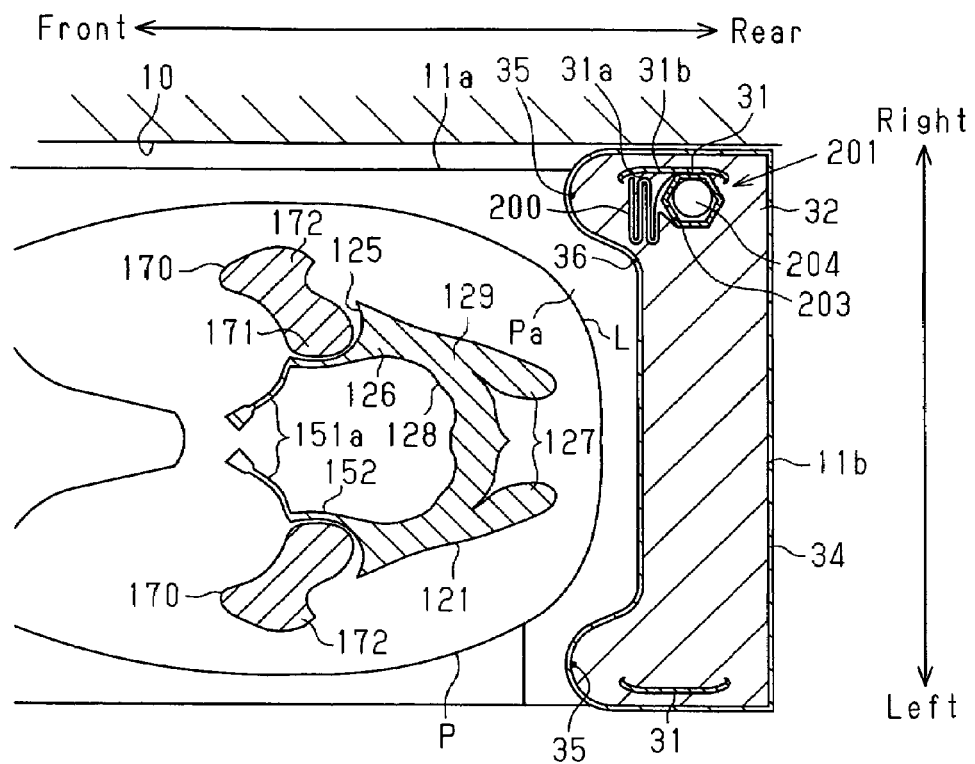
FIG. 8A is a cross-sectional view illustrating an airbag before being deployed.
Figure 8B:
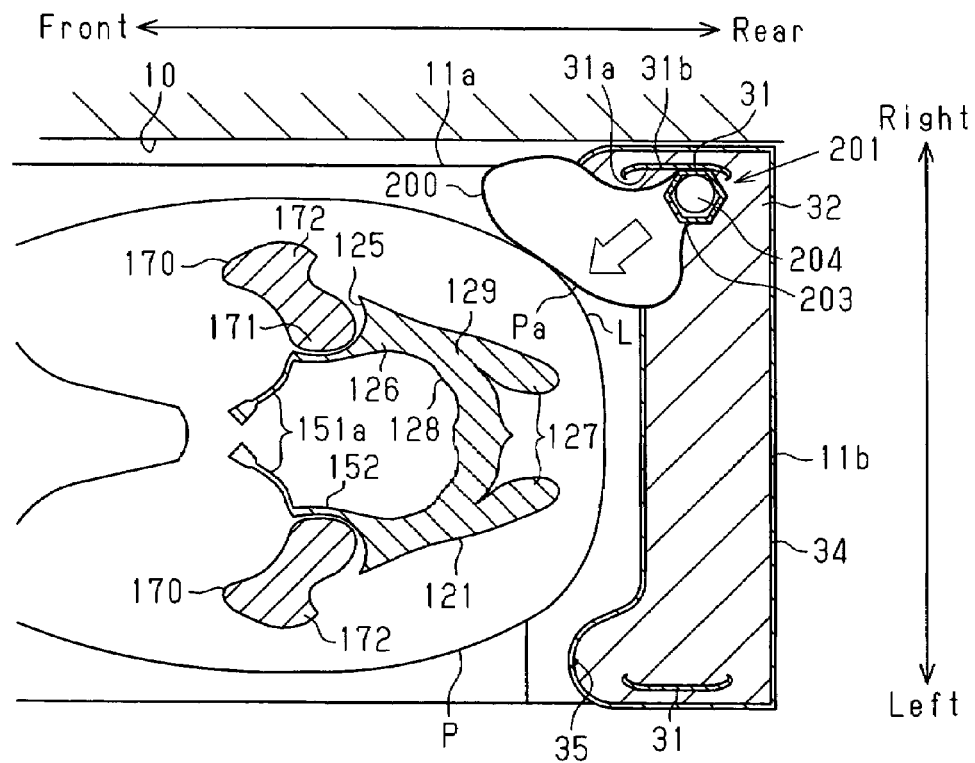
FIG. 8B is a cross-sectional view illustrating the airbag after being deployed.

The airbag 200 has a pair of substantially circular cloth sheets made of woven cloth. The cloth sheets are sewn together at the periphery to form the airbag 200. As shown in FIG. 8A, the airbag 200 is accommodated in the case in a folded state. In this embodiment, the airbag 200 in a deployed state has a size that covers a circle about a hip point H of the occupant P as shown in FIG. 7, which circle has a diameter D (200 mm to 250 mm). The size of the airbag 200 permits the airbag 200 to press the lumbar region L of the occupant P in a predetermined portion, and permits an appropriate pressing force to be applied to the entirety of the predetermined portion. As shown in FIGS. 7 to 8B, the airbag 200 pops out of the cushion member 32 of the backrest 11b when inflated, and is spread in a space defined by the seat belt 6, the seat portion 11a, the backrest 11b, the door 10 (or the seat back frame 31), and the lumbar region L (buttocks) of the occupant p.

The operation of the airbag apparatus 201 will now be described.

When the sensor detects a collision, the inflator 204 is activated and sends high-pressure gas to the airbag 200. This unfolds the airbag 200 and starts inflating the airbag 200. When the airbag 200 is inflated, the case is unfolded. When the airbag 200 is inflated, the seat back frame 31 receives a reaction force directed toward the right side of the vehicle (if located in the left seat, a reaction force directed toward the left side), and the backrest 11b receives a backward reaction force. Therefore, the airbag 200 starts being inflated toward the left front portion of the vehicle (in a direction indicated by a hollow arrow in FIG. 8B).

If the airbag 200 continues being inflated, the airbag 200 crashes through the cushion member 32 at a breakable portion 36 formed in the seat skin 34 of the cushion member 32 as shown in FIG. 8B. When the airbag 200 crashes through the cushion member 32, the door 10 and the seat back frame 31 receive a reaction force directed toward the right side of the vehicle, and the backrest 11b receives reaction force directed backward. That is, when the airbag 200 is inflated, the door 10 and the seat back frame 31, and the backrest 11b receive reaction force corresponding to the force urging the airbag 200 in the deploying direction and reaction force generated by pushing the occupant P. The reaction forces are directed in direction opposite to the direction of force for deploying the airbag 200 (urging direction of the airbag 200). In this embodiment, the reaction forces that correspond to and directed in opposite directions to the urging forces of the airbag 200 is received by the seat back frame 31 and the door 10 with respect to the lateral direction (mainly, the seat back frame 31), and by the backrest 11b with respect to the front-rear direction. That is, a diagonal reaction force (the force that acts in a direction opposite to the direction of the hollow arrow in FIG. 8B) is received after being decomposed. In other words, the reaction force is received by a corner section defined by the seat back frame 31 and the door 10, and the backrest 11b. In this embodiment, the airbag apparatus 201 does not include a reaction receiving member for directly receiving reaction force that corresponds to and is directed in the opposite direction of the urging force of the airbag 200. However, it may be configured that the reaction force is received without being decomposed. In this embodiment, reaction force is decomposed into a component in the lateral direction and a component in the front-rear direction. However, the directions of the components may be arbitrarily changed.

The breakable portion 36 is located inward of the seat back frame 31, and located at a position behind the lumbar region L of the occupant P (closer to the center of the seat 11 than the seam 35) and extends in a vertical direction. That is, the breakable portion 36 is arranged to permit the airbag 200 to project in a position diagonally behind the lumbar region L of the occupant P and to press the lumbar region L. The breakable portion 36 is a section that is partially weakened in the seat skin 34, so that the airbag 200 pops out through the breakable portion 36. The breakable portion 36 of this embodiment is formed by providing a slit, but may be formed by providing a seam. In this embodiment, the position of the seat back frame 31 in the lateral direction may be changed in accordance with the positions of the seam 35 and the breakable portion 36.

To prevent the airbag 200 from being excessively inflated forward of the lumbar region L of the occupant P, the seat belt 6 receives a reaction force generated by being pressed. Accordingly, the pressing surface Pa of the airbag 200, which contacts the occupant P, is formed substantially flat and inclined relative to the door 10 (the inner wall 13) such that the airbag 200 projects further into the passenger compartment as it approaches the rear end. The pressing surface Pa, which is pressed against the occupant P, corresponds to the inclined surface 23 of the first embodiment. Therefore, on a side of the lumbar region L of the occupant P, the pressing surface Pa (inclined surface 23) is arranged as to contact the lumbar region L (buttocks) of the occupant P in a rear portion of the pelvis 111 about the ilium 121, specifically, in a section that corresponds to the pelvis 111 rearward of the acetabula 125.

That is, the airbag 22 (impact absorbing member 21) is inflated such that the pressing surface Pa (inclined surface 23) is inclined relative to the door (the inner wall 13) and the seat back frame 31 by a predetermined angle such that the airbag 22 projects further into the passenger compartment as it approaches the rear end. Since the door 10 and the backrest 11b receive reaction force, the airbag 200 presses the buttocks of the occupant P toward the front and left end of the vehicle (direction indicated by hollow arrow in FIG. 8B) when inflated. The airbag apparatus 201 is located at a lower portion of the seat back frame 31, and is normally located lower than the buttocks of the occupant P. The pressing surface Pa thus protrudes further into the passenger compartment as it approaches the lower end. Since the seat portion 11a receives reaction force directed downward from the airbag 200, which permits the airbag 200 to press the buttocks of the occupant P upward. Thus, in this embodiment, the seat back frame 31 (and the door 10), the seat portion 11a, the backrest 11b, and the seat belt 6 function as a reaction receiving member.

In this embodiment, the airbag 200 crashes through the cushion member 32 when inflated. However, the airbag 200 may be configured to press the occupant P through the cushion member 32. In this embodiment, the internal pressure of the airbag 200 when inflated is set to be in a range from 150 kPa to 250 kPa.

In addition to the items (1) to (7) of the first embodiment, the second embodiment provides the following advantages.

(12) Since the airbag 200 is located inside of a lower portion of the seat back frame 31, the airbag 200 is inflated in a space defined by the backrest 11b, the seat back frame 31, and the seat portion 11a. Therefore, when inflated, the lumbar region airbag 200 contacts the lumbar region L of the occupant P in a section corresponding to a portion of the pelvis 111 rearward of the acetabula 125 or a section corresponding to the ilium 121 in the skeletal structure of the occupant P. Also, when inflated, the airbag 200 applies a diagonally forward force to the lumbar region L of the occupant P. Accordingly, the lumbar region L of the occupant is pressed toward the center of the vehicle, while preventing the pubis from receiving an excessive load from the greater trochanter.

(13) When the airbag 200 is inflated, the seat back frame 31 (and the door 10), the seat portion 11a, the backrest 11b, and the seat belt 6 receive reaction force from the airbag 200. Therefore, the airbag 200 readily contacts the lumbar region L of the occupant P in a predetermined portion (a section corresponding to a portion of the pelvis 111 rearward of the acetabula 125 or a section corresponding to the ilium 121). The airbag 200 is thus inflated to project in a predetermined direction. Accordingly, the lumbar region of the occupant is pressed toward the center of the vehicle, while preventing the pubis 123 from receiving an excessive load from the greater trochanter 172.

Third Embodiment

A third embodiment of the present invention will now be described. Like or the same reference numerals are given to those components that are like or the same as the corresponding components of the first embodiment, and detailed explanations and drawings are omitted or simplified.

Figure 9:
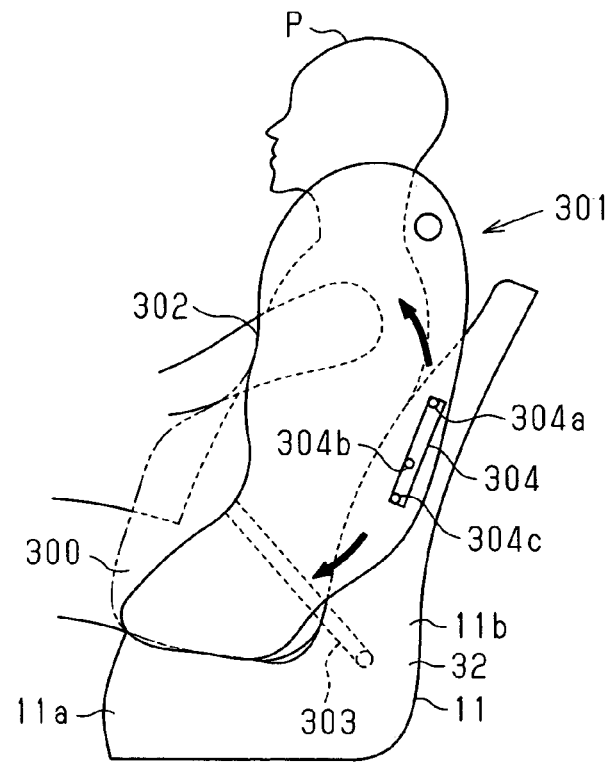
FIG. 9 is a side view illustrating a vehicle seat and an airbag apparatus according to a third embodiment.

FIG. 9 schematically shows a side airbag 300 (hereinafter, simply referred to as an airbag 300), functioning as an impact absorbing member 21. The backrest 11b includes a pair of seat back frames 31 in lateral ends. The seat back frames 31 are formed like flat plates and extend vertically (see FIG. 10). The backrest 11b also includes a cushion member 32, which completely covers the seat back frames 31.

An airbag apparatus 301 having the airbag 300 is accommodated in a case (not shown), which is accommodated in the backrest 11b of the seat 11. In a side collision of the vehicle, the airbag 300 is deployed (and inflated) forward from the backrest 11b, so that a pressing surface contacts the lumbar region L (buttocks) and the thorax of the occupant P.

Figure 10:
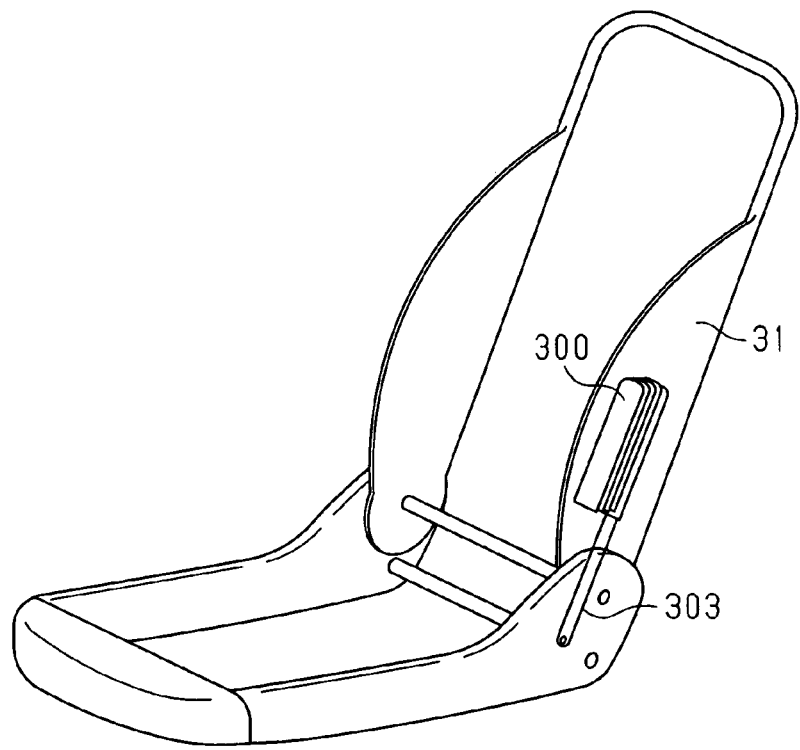
FIG. 10 is a perspective view illustrating a seat back frame and the airbag apparatus according to the third embodiment.

Specifically, as shown in FIGS. 9 and 10, the airbag apparatus 301 is embedded in the cushion member 32. The airbag apparatus 301 is located adjacent to the right (outer side of the vehicle) of the seat back frame 31 of the backrest 11b and corresponds to the door (not shown), which forms a side portion of the vehicle body. Although only the left seat 11 is illustrated in the drawings, a right seat has a similar airbag apparatus 301 in its right portion. The airbag apparatus 301 is substantially located at a vertical center of the seat back frame 31.

As shown in FIG. 9, the airbag apparatus 301 has a cylindrical retainer (not shown), a gas generator, and an airbag 300 (an impact absorbing member 21). The gas generator is a cylindrical inflator 304 located in the retainer in this embodiment. The airbag 300 covers the retainer and the inflator 304. Prior to inflation (deployment), the airbag 300 is accommodated in the casein a state held between the retainer and the casing. The inflator 304 accommodates gas generating agent for deploying and inflating the airbag 300. The inflator 304 has a gas port 304a at an upper end, a gas port 304b at a center, and a gas port 304c at a lower end, for discharging gas generated by the gas generating agent. The inflator 304 is electrically connected to a collision detector, or a sensor, for detecting a collision on a side of the vehicle body.

The airbag 300 has a pair of cloth sheets made of woven cloth. The cloth sheets have the same size and the same shape, and are sewn together at the periphery to form the airbag 300. The airbag 300 is accommodated in the case in a folded state.

Figure 11:
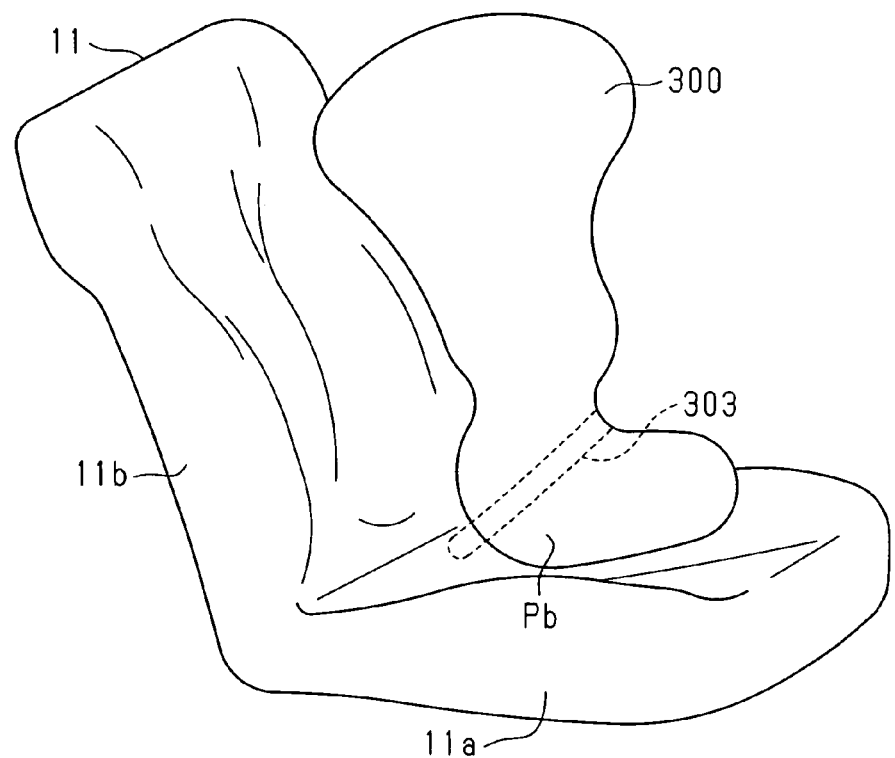
FIG. 11 is a perspective view illustrating the airbag according to the third embodiment when inflated.

As shown FIGS. 9 and 11, the airbag 300 pops out of the cushion member 32 of the backrest 11b when inflated, so that an upper portion of the airbag 300 is located lateral to a shoulder of the occupant, a central portion of the airbag 300 is located lateral to the thorax, and the lower portion of the airbag 300 is located lateral to the lumbar region. A part of the upper front portion of the airbag 300 is formed as a concaved portion 302, which is concaved toward the rear end, so that an upper arm of the occupant P is not restrained excessively. That is, in this embodiment, the concaved portion 302 is located in a position corresponding to the upper arm of the occupant P (see FIG. 9).

In a lower portion of the airbag 300, a pressing surface Pb of the airbag 300, which contacts the occupant P, is substantially flat and inclined relative to the door (the inner wall 13) such that the airbag 300 projects further into the passenger compartment as it approaches the rear end. That is, in a lower portion of the airbag 300, the pressing surface Pb, which is pressed against the occupant P, corresponds to the inclined surface 23 of the first embodiment. Therefore, on a side of the lumbar region L of the occupant P, the pressing surface Pb is arranged as to contact the lumbar region L (buttocks) of the occupant P in a rear portion of the pelvis 111 about the ilium 121, specifically, in a section that corresponds to the pelvis 111 rearward of the acetabula 125.

One end of a cord-like tether 303 is attached to a lower front portion of the airbag 300, which portion is located on the inner surface (inner surface of the cloth sheet) of the lower portion of the airbag 300 when inflated. The other end of the tether 303 projects from a rear portion of the airbag 300 and is fixed to the seat back frame 31 as shown in FIGS. 9 and 10. When the airbag 300 is inflated, the tether 303 prevents the inner surface of the lower portion of the airbag 300 from moving away from the seat portion 11a (the joint between the tether 303 and the seat portion 11a) by a value greater than a predetermined distance. That is, the inner surface of the lower portion of the airbag 300, to which the tether 303 is fixed, appears to be drawn toward the seat portion 11a toward the seat portion 11a compared to the remainder of the airbag 300.

The operation of the airbag apparatus 301 will now be described.

When the sensor detects a collision, the inflator 304 is activated and sends high-pressure gas to the airbag 300. This unfolds the airbag 300 and starts inflating the airbag 400. When inflated, the airbag 300 restrains part of the body of the occupant P including the lumbar region L and a shoulder with a high restraining force.

When the airbag 300 is inflated to a certain extent, the inner surface of the lower portion of the airbag 300 appears to be drawn by the tether 303 toward the fixed end of the tether 303. This suppresses the frontward inflation of the lower portion of the airbag 300, so that airbag 300 is sufficiently inflated in the lateral direction. Thus, the airbag 300 is inflated such that the pressing surface Pb is inclined relative to the door 10 by a predetermined angle such that the airbag 300 projects further into the passenger compartment as it approaches the rear end. In this embodiment, the internal pressure of the lower portion of the airbag 300 (a portion that contacts the lumbar region) when inflated is set to be in a range from 150 kPa to 250 kPa.

In addition to the items (1) to (7) of the first embodiment, the third embodiment provides the following advantage.

(14) The airbag 300 protects a side of the body of the occupant P including the lumbar region L and a shoulder. Therefore, a side of the occupant is protected as well as the lumbar region. Also, the tether 303 for limiting the forward movement of the lower front portion of the airbag 300 is provided. Therefore, in the side airbag 300, which has a contacting surface that contacts a side of the lumbar region L of the occupant P, the thickness of the lower portion of the airbag 300 in the lateral direction of the vehicle can be set greater in a rear portion than in a front portion. Therefore, when inflated, the lower portion of the side airbag contacts the lumbar region L of the occupant P in a section corresponding to a portion of the pelvis 111 rearward of the acetabula 125 or a section corresponding to the ilium 121 in the skeletal structure of the occupant P.

Fourth Embodiment

A fourth embodiment of the present invention will now be described. Like or the same reference numerals are given to those components that are like or the same as the corresponding components of the first embodiment, and detailed explanations and drawings are omitted or simplified.

Figure 12:
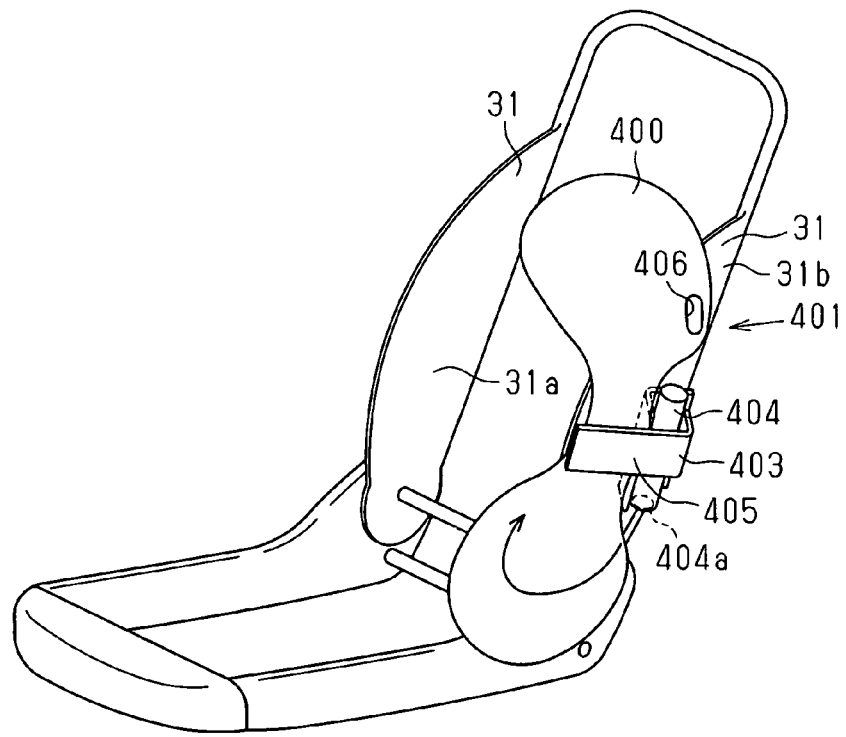
FIG. 12 is a perspective view illustrating a vehicle seat and an airbag apparatus according to a fourth embodiment.

FIG. 12 schematically shows a side airbag 400 (hereinafter, simply referred to as an airbag 400), functioning as an impact absorbing member 21. The backrest 11b includes a pair of seat back frames 31 in the lateral ends. The seat back frames 31 are formed like flat plates and extend vertically. The backrest 11b also includes a cushion member (not shown), which completely covers the seat back frames 31.

As shown in FIG. 12, an airbag apparatus 401 having the airbag 400 is accommodated in a case (not shown), which is accommodated in the backrest 11b of the seat 11. In a side collision of the vehicle, the airbag 400 is deployed (and inflated) forward from the backrest 11b, so that a pressing surface contacts the lumbar region L (buttocks) and the thorax of the occupant P.

Figure 13A:
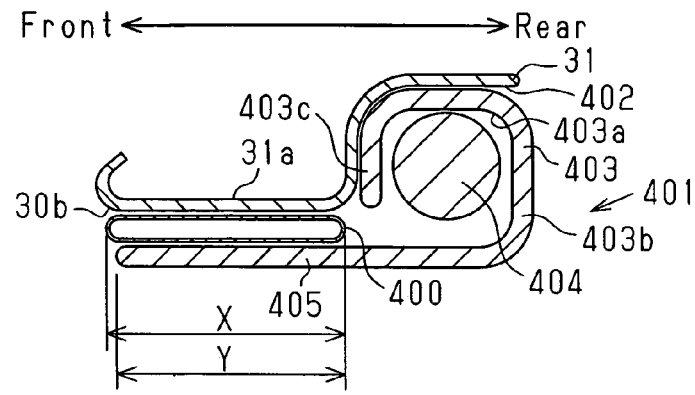
FIGS. 13A and 13B are cross-sectional views illustrating the airbag apparatus according to the fourth embodiment.
Figure 13B:
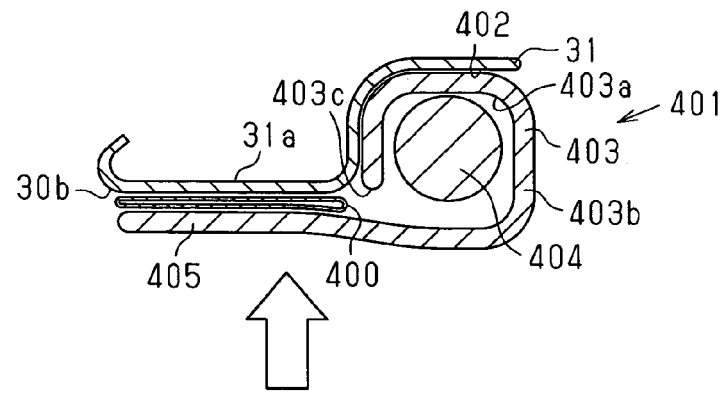

Specifically, as shown in FIG. 12, the airbag apparatus 401 is embedded in the cushion member. The airbag apparatus 401 is located adjacent to the right (outer side of the vehicle) of the seat back frame 31 of the backrest 11b and corresponds to the door (not shown), which forms a side portion of the vehicle body. More specifically, as shown in FIGS. 13A and 13B, an accommodation recess 402 for accommodating the airbag apparatus 401 is formed in an outer surface 31b of the seat back frame 31 (a surface facing the door). The airbag apparatus 401 is accommodated in and fixed to the accommodation recess 402. Although only the left seat 11 is illustrated in the drawings, a right seat has a similar airbag apparatus 401 in its right portion. The airbag apparatus 401 is substantially located at a vertical center of the seat back frame 31.

As shown in FIG. 12, the airbag apparatus 401 has a retainer 403, a gas generator, and the airbag 400 (an impact absorbing member 21). The gas generator is a cylindrical inflator 404 located in the retainer 403 in this embodiment. As shown in FIGS. 13A and 13B, the retainer 403 includes an accommodation portion 403a having a U-shaped horizontal cross-section and a pressing portion 405 that extends forward from a rear end 403b the opening of the accommodation portion 403a. The accommodation portion 403a extends in the vertical direction and accommodates the inflator 404. The accommodation portion 403a is arranged to open toward a side of the vehicle. The pressing portion 405 is substantially formed as a flat plate, and extends to the front end of the seat back frame 31 to cover the opening of the accommodation portion 403a. Before the airbag 400 is deployed, the pressing portion 405 is spaced away from the seat back frame 31 by a predetermined distance in the vehicle lateral direction. Before the airbag 400 is deployed, the pressing portion 405 is spaced away from a front end 403c of the opening of the accommodation portion 403a by a predetermined distance in the vehicle lateral direction.

Prior to inflation (deployment), the airbag 400 is accommodated in the case in a folded state. The inflator 404 accommodates gas generating agent for deploying and inflating the airbag 400. The inflator 404 has a gas port 404a for discharging gas generated by a gas generating agent at the lower end. The gas port 404a is connected to a lower portion of the airbag 400 so that gas is supplied to the lower portion. That is, the gas port 404a discharges gas toward the lower end of the airbag 400. In this embodiment, the inflator 404 is located outside of the airbag 400, but may be located inside the airbag 400. The inflator 404 is electrically connected to a collision detector, or a sensor, for detecting a collision on a side of the vehicle body.

The airbag 400 has a pair of cloth sheets made of woven cloth. The cloth sheets have the same size and the same shape, and are sewn together at the periphery to form the airbag 400. As shown FIG. 12, the airbag 400 pops out of the cushion member of the backrest 11b when inflated, so that an upper portion of the airbag 400 is located lateral to a shoulder of the occupant, a central portion of the airbag 400 is located lateral to the thorax, and the lower portion of the airbag 400 is located lateral to the lumbar region. A part of the front central portion of the airbag 400 is formed as a concaved portion. Also, a part of the rear portion of the airbag 400 is concaved. Accordingly, as shown in FIG. 13, a length X along the front-rear direction of the center of the airbag 400 when inflated is substantially the same as a length Y from the front end of the seat back frame 31 to the front end of the accommodation recess 402. A vent hole 406 for discharging excessive portion of gas in the airbag 400 is formed in an upper portion of the airbag 400.

In a lower portion of the airbag 400, a pressing surface of the airbag 400, which contacts the occupant P, is substantially flat and inclined relative to the door (the inner wall 13) such that the airbag 400 projects further into the passenger compartment as it approaches the rear end. That is, in a lower portion of the airbag 400, the pressing surface, which is pressed against the occupant P, corresponds to the inclined surface 23 of the first embodiment. Therefore, on a side of the lumbar region L of the occupant P, the pressing surface is arranged as to contact the lumbar region L (buttocks) of the occupant P in a rear portion of the pelvis 111 about the ilium 121, specifically, in a section that corresponds to the pelvis 111 rearward of the acetabula 125.

The operation of the airbag apparatus 401 will now be described.

When the sensor detects a collision, the inflator 404 is activated and sends high-pressure gas to the airbag 400. This unfolds the airbag 400 and starts inflating the airbag 400. When inflated, the airbag 400 restrains part of the body of the occupant P including the lumbar region L and a shoulder with a high restraining force. At this time, the other vehicle that has collided causes the door to bulge inward, generating rightward pressing force. When receiving a predetermined pressing force, the pressing portion 405 is bent inward (rightward) as shown in FIG. 13B. The length of a central portion of the airbag 400 is not more than the length of the seat back frame 31 and the length of the pressing portion 405. Thus, when bent inward, the pressing portion 405 substantially presses the central portion of the airbag 400. That is, the central portion of the airbag 400 is tightly held between the pressing portion 405 and the seat back frame 31.

When tightly held, gas from the lower portion of the airbag 400 cannot smoothly flow to the upper portion, and the airbag 400 is substantially divided into the upper portion and the lower portion. The inflator 404 injects gas into the lower portion of the airbag 400, while the vent hole 406 located in the upper portion of the airbag 400 discharges the gas in the upper portion of the airbag 400. Thus, compared to the upper portion, the internal pressure of the lower portion of the airbag 400 is relatively high. The lumbar region of the occupant P is therefore pressed by a high pressure, while the thorax is pressed by a lower pressure. In this embodiment, the retainer 403 functions as an internal pressure adjusting mechanism. In this embodiment, the internal pressure of the lower portion of the airbag 400 (a portion that contacts the lumbar region) when the airbag 400 is divided is set to be in a range from 150 kPa to 250 kPa, and is lower than the internal pressure of the upper portion.

In addition to the items (1) to (7) of the first embodiment, the fourth embodiment provides the following advantage.

(15) When a side collision of the vehicle occurs and the pressing portion 405 receives a predetermined pressing force, the side airbag 400 is substantially divided into the upper portion and the lower portion. Since the vent hole 406 for discharging gas is formed in the upper portion of the airbag 400, and the lower portion is supplied with gas from the inflator 404 for generating gas, the internal pressure of the lower portion of the airbag 400, which has a contact surface contacting a side of the lumbar region L of the occupant P, is higher than that in the upper portion. Therefore, while maintaining pressing force applied to the side of the lumbar region L, the internal pressure of the upper portion of the airbag 400 can be lowered. That is, if the internal pressure of the lower portion of the airbag 400 is increased to maintain the shape of the lower portion, the internal pressure of the upper portion can be maintained relatively low so that no excessive pressing force is applied to the thorax of the occupant P.

Fifth Embodiment

A fifth embodiment of the present invention will now be described. Like or the same reference numerals are given to those components that are like or the same as the corresponding components of the first embodiment, and detailed explanations and drawings are omitted or simplified.

Figure 14:
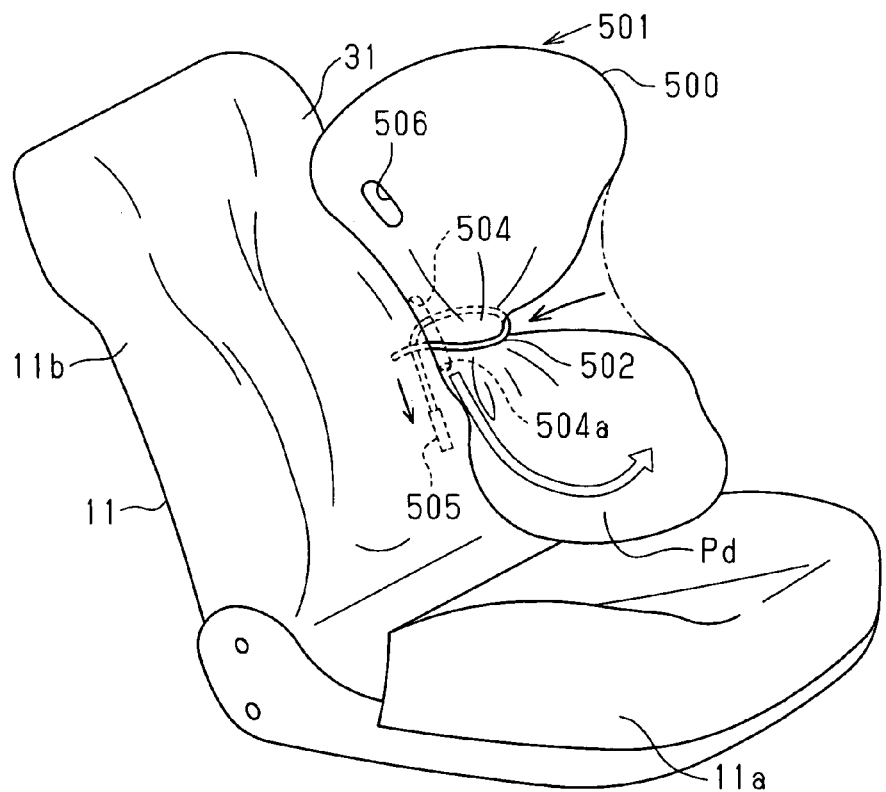
FIG. 14 is a perspective view illustrating an airbag according to a fifth embodiment when inflated.

FIG. 14 schematically shows a side airbag 500 (hereinafter, simply referred to as an airbag 500), functioning as an impact absorbing member 21. An airbag apparatus 501 having the airbag 500 is accommodated in a case (not shown), which is accommodated in the backrest 11b of the seat 11. In a side collision of the vehicle, the airbag 500 is deployed (and inflated) forward from the backrest 11b, so that a pressing surface contacts the lumbar region L (buttocks) and the thorax of the occupant P. The airbag apparatus 501 is substantially located at a vertical center of the backrest 11b.

The airbag apparatus 501 has a cylindrical retainer (not shown), a gas generator, and an airbag 500. The gas generator is a cylindrical inflator 504 located in the retainer in this embodiment. The airbag 500 covers the retainer and the inflator 504. Prior to inflation (deployment), the airbag 500 is accommodated in the casein a state held between the retainer and the casing. The inflator 504 accommodates gas generating agent for deploying and inflating the airbag 500. The inflator 504 has a gas port 504a for discharging gas generated by a gas generating agent at the lower end. The gas port 504a injects gas to the lower portion of the airbag 500 (flow of gas is shown by a hollow arrow in FIG. 14). The inflator 504 is electrically connected to a collision detector, or a sensor, for detecting a collision on a side of the vehicle body.

The airbag 500 according to the fifth embodiment has a pair of cloth sheets made of woven cloth. The cloth sheets have the same size and the same shape, and are sewn together at the periphery to form the airbag 500. The airbag 500 is accommodated in the case in a folded state.

As shown FIG. 14, the airbag 500 pops out of the cushion member 32 of the backrest 11b when inflated, so that an upper portion of the airbag 500 is located lateral to a shoulder of the occupant, a central portion of the airbag 500 is located lateral to the thorax, and the lower portion of the airbag 500 is located lateral to the lumbar region. A vent hole 506 for discharging excessive portion of gas is formed in an upper portion of the airbag 500.

A cord-like tether 502 is wound about the circumference of the central portion of the airbag 500. The ends of the tether 502 are fixed to the seat back frame 31 of the backrest 11b. A tether retractor mechanism 505 is provided at one end of the tether 502 to retract the tether 502 toward the seat back frame 31.

In a lower portion of the airbag 500, a pressing surface Pd of the airbag 500, which contacts the occupant P, is substantially flat and inclined relative to the door (the inner wall 13) such that the airbag 500 projects further into the passenger compartment as it approaches the rear end. That is, in a lower portion of the airbag 500, the pressing surface Pd, which is pressed against the occupant P, corresponds to the inclined surface 23 of the first embodiment. Therefore, on a side of the lumbar region L of the occupant P, the pressing surface Pd is arranged as to contact the lumbar region L (buttocks) of the occupant P in a rear portion of the pelvis 111 about the ilium 121, specifically, in a section that corresponds to the pelvis 111 rearward of the acetabula 125.

The operation of the airbag apparatus 501 will now be described.

When the sensor detects a collision, the inflator 504 is activated and sends high-pressure gas to the airbag 500. This unfolds the airbag 500 and starts inflating the airbag 400. When inflated, the airbag 500 restrains part of the body of the occupant P including the lumbar region L and a shoulder with a high restraining force.

When the airbag 500 is inflated to a certain extent, the tether retractor mechanism 505 retracts one end of the tether 502 toward the seat back frame 31 (in a direction indicated by a downward arrow in FIG. 14). The tether 502 squeezes a central portion of the airbag 500, so that gas does not smoothly flow from the lower portion to the upper portion of the airbag 500. The airbag 500 is thus substantially divided into the upper portion and the lower portion. The inflator 504 injects gas into the lower portion of the airbag 500 through the gas port 504*a* formed in the lower end of the inflator 504, while the vent hole 506 discharges the gas in the upper portion of the airbag 500. Thus, compared to the upper portion, the internal pressure of the lower portion of the airbag 500 is relatively high. The lumbar region of the occupant P is therefore pressed by a high pressure, while the thorax is pressed by a lower pressure. The tether 502 and the tether retractor mechanism 505 of this embodiment function as an internal pressure adjusting mechanism. In this embodiment, the internal pressure of the lower portion of the airbag 500 (a portion that contacts the lumbar region) when the airbag 500 is divided is set to be in a range from 150 kPa to 250 kPa, and is lower than the internal pressure of the upper portion.

In addition to the items (1) to (7) of the first embodiment, the fifth embodiment provides the following advantage.

(16) When the airbag 500 is inflated, the tether 502 squeezes the central portion of the airbag 500, suppressing the flow of gas from the lower portion to the upper portion of the airbag 500. That is, when the airbag 500 is inflated, the airbag 500 is substantially divided into the upper portion and the lower portion. Since the vent hole 506 for discharging gas is formed in the upper portion of the airbag 500, and the lower portion is supplied with gas from the inflator 504 for generating gas, the internal pressure of the lower portion of the airbag 500, which has a contact surface contacting a side of the lumbar region L of the occupant P, is higher than that in the upper portion. Therefore, while maintaining pressing force applied to the side of the lumbar region L, the internal pressure of the upper portion of the airbag 500 can be lowered. That is, if the internal pressure of the lower portion of the airbag 500 is increased to maintain the shape of the lower portion, the internal pressure of the upper portion can be maintained relatively low so that no excessive pressing force is applied to the thorax of the occupant P.

Sixth Embodiment

A sixth embodiment of the present invention will now be described. Like or the same reference numerals are given to those components that are like or the same as the corresponding components of the first embodiment, and detailed explanations and drawings are omitted or simplified.

Figure 15A:
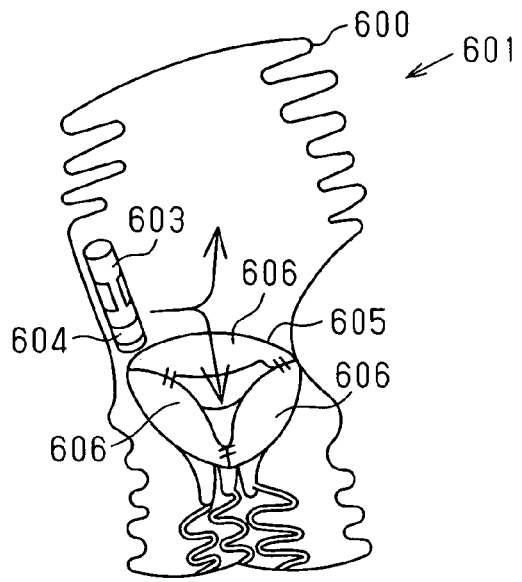
FIG. 15A is a diagrammatic cross-sectional view illustrating an airbag according to a sixth embodiment before being inflated.
Figure 15C:
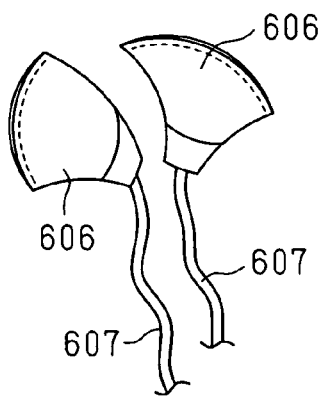
FIG. 15C is an enlarged view showing the sectoral pieces shown in FIG. 15A.
Figure 15B:
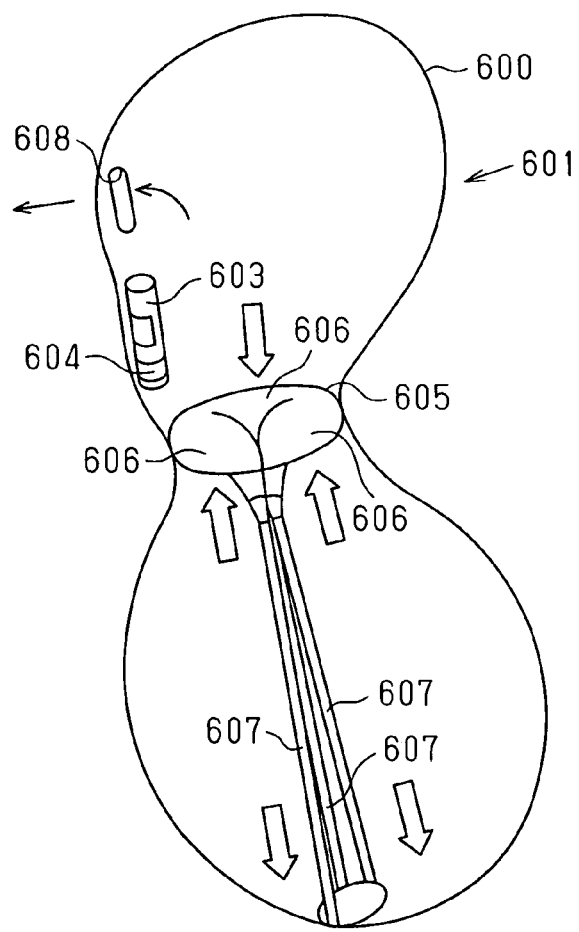
FIG. 15B is a diagrammatic cross-sectional view illustrating the airbag according to the sixth embodiment when inflated.

FIGS. 15A to 15C schematically show a side airbag 600 (hereinafter, simply referred to as an airbag 600), functioning as an impact absorbing member 21. An airbag apparatus 601 having the airbag 600 is accommodated in a case, which is accommodated in the backrest 11*b* of the seat 11. In a side collision of the vehicle, the airbag 600 is deployed (and inflated) forward from the backrest 11*b*, so that a pressing surface contacts the lumbar region L (buttocks) and the thorax of the occupant P. The airbag apparatus 601 is substantially located at a vertical center of the backrest 11*b*.

As shown in FIGS. 15A to 15B, the airbag apparatus 601 has a cylindrical retainer 603, a gas generator, and the airbag 600. The gas generator is a cylindrical inflator 604 located in the retainer 603 in this embodiment. Prior to inflation (deployment), the airbag 600 is accommodated in a folded state. The inflator 604 accommodates gas generating agent for deploying and inflating the airbag 600. The inflator 604 has gas ports for discharging gas generated by the gas generating agent. The inflator 604 is electrically connected to a collision detector, or a sensor, for detecting a collision on a side of the vehicle body.

The airbag 600 has a pair of cloth sheets made of woven cloth. The cloth sheets have the same size and the same shape, and are sewn together at the periphery to form the airbag 600. The airbag 600 pops out of the cushion member of the backrest 11*b* when inflated, so that an upper portion of the airbag 600 is located lateral to a shoulder of the occupant, a central portion of the airbag 600 is located lateral to the thorax, and the lower portion of the airbag 600 is located lateral to the lumbar region. A central portion of the airbag 600 has a shorter diameter compared to an upper portion and a lower portion of the airbag 600.

An internal pressure adjusting mechanism for adjusting flow and direction of gas in the airbag 600 is provided in a central portion of the airbag 600. In this embodiment, the internal pressure adjusting mechanism is a flow control valve 605. The flow control valve 605 has a structure similar to that of valves of the human heart. Specifically, the flow control valve 605 includes a plurality of (three, in this embodiment) sectoral pieces 606.

The sectoral pieces 606 are made of cloth, and each have a sectoral shape as shown in FIG. 15C. The sides of the sectoral pieces 606, each of which extends from the center of the corresponding arc to one end of the arc, are sewn together. Specifically, the sectoral pieces 606 are sewn together such that the arcs substantially form a perfect circle. Each sectoral piece 606 is sewn to the adjacent sectoral pieces 606 from the end of the arc toward the center of the sector by a predetermined distance, so that the central portions of the sectors are not sewn together. That is, the flow control valves 605 are sewn together such that gas can flow through the center of the flow control valve 605.

One end of a long cord-like tether 607 is connected to the center of each sectoral piece 606 (center of each sector). The other end of each tether 607 is sewn to the inner surface of the lower portion of the side airbag 600. The length of each tether 607 is slightly shorter than the distance from the center of the airbag 600 when inflated (position at which the flow control valve 605) is located) to the lower end of the airbag 600. A vent hole 608 for discharging excessive portion of gas in the airbag 600 is formed in an upper portion of the airbag 600.

In a lower portion of the airbag 600, a pressing surface of the airbag 600, which contacts the occupant P, is substantially flat and inclined relative to the door (the inner wall 13) such that the airbag 600 projects further into the passenger compartment as it approaches the rear end. That is, in a lower portion of the airbag 600, the pressing surface, which is pressed against the occupant P, corresponds to the inclined surface 23 of the first embodiment. Therefore, on a side of the lumbar region L of the occupant P, the pressing surface is arranged as to contact the lumbar region L (buttocks) of the occupant P in a rear portion of the pelvis 111 about the ilium 121, specifically, in a section that corresponds to the pelvis 111 rearward of the acetabula 125.

The operation of the airbag apparatus 601 will now be described.

When the sensor detects a collision, the inflator 604 is activated and sends high-pressure gas to the airbag 600. This unfolds the airbag 600 and starts inflating the airbag 600. When inflated, the airbag 600 restrains part of the body of the occupant P including the lumbar region L and a shoulder with a high restraining force.

When the airbag 600 is inflated as shown in FIG. 15B, the tethers 607 are extended to the maximum degree, so that the center of the sectoral pieces 606 cannot be moved further from the lower portion of the airbag 600 than a certain distance. In this state, when the internal pressure of the lower portion of the airbag 600 reaches a predetermined level, the centers of the sectoral pieces 606 press one another. This substantially closes the center hole of the flow control valve 605, and prevents flow of gas from the upper portion of the airbag 600. On the other hand, gas is prevented from flowing out of the lower portion of the airbag 600. This maintains the internal pressure of the lower portion of the airbag 600 to a predetermined level. Since the vent hole 608 is formed in the upper portion of the airbag 600, the internal pressure of the upper portion of the airbag 600 is relatively low compared to that of the lower portion. The lumbar region L of the occupant P is therefore pressed by a high pressure, while the thorax and a shoulder are pressed by a lower pressure. In this embodiment, the internal pressure of the lower portion of the airbag 600 (a portion that contacts the lumbar region) when the airbag 600 is divided is set to be in a range from 150 kPa to 250 kPa, and is lower than the internal pressure of the upper portion.

In addition to the items (1) to (7) of the first embodiment, the sixth embodiment provides the following advantage.

(17) The flow control valve 605 for adjusting the flow rate and the flowing direction of gas in the airbag 600 is provided in a central portion of the airbag 600. It is therefore possible to push the lumbar region L of the occupant P with a high pressure, while pushing the thorax and a shoulder with a lower pressure. On the other hand, since the vent hole 608 for discharging gas is formed in the upper portion of the airbag 600, the internal pressure of the lower portion of the airbag 600, which has a pressing surface (contact surface) contacting a side of the lumbar region L of the occupant P, is higher than that in the upper portion. Therefore, while maintaining pressing force applied to the side of the lumbar region L, the internal pressure of the upper portion of the airbag 600 can be lowered. That is, if the internal pressure of the lower portion of the airbag 600 is increased to maintain the shape of the lower portion, the internal pressure of the upper portion can be maintained relatively low so that no excessive pressing force is applied to the thorax of the occupant P.

Seventh Embodiment

A seventh embodiment of the present invention will now be described. Like or the same reference numerals are given to those components that are like or the same as the corresponding components of the second embodiment, and detailed explanations and drawings are omitted or simplified.

Figure 16:
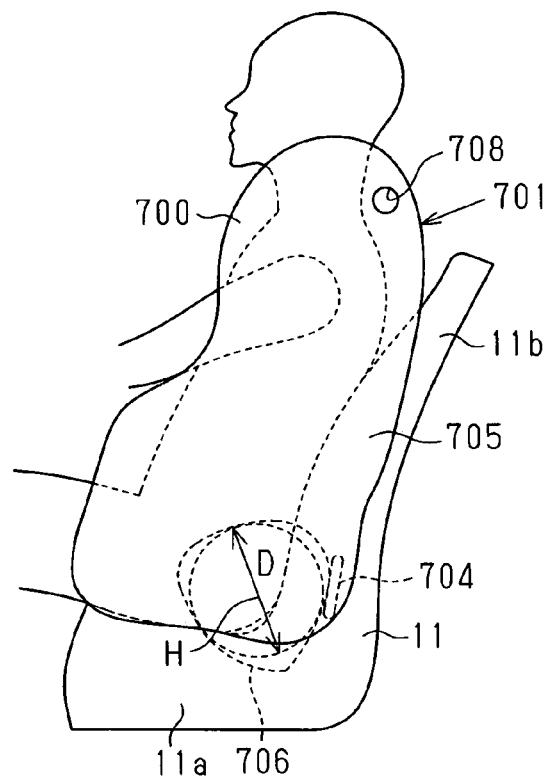
FIG. 16 is a side view illustrating an airbag apparatus according to a seventh embodiment.
Figure 17A:
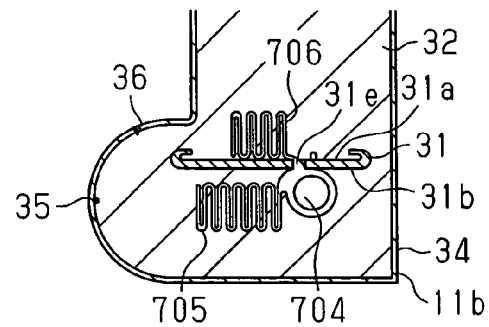
FIG. 17A is a cross-sectional view illustrating the airbag according to the seventh embodiment before being deployed.
Figure 17B:
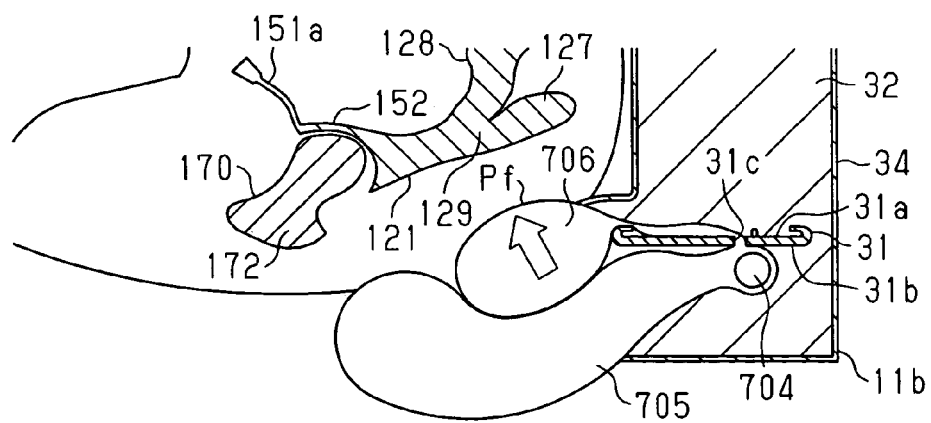
FIG. 17B is a cross-sectional view illustrating the airbag according to the seventh embodiment after being deployed.

FIGS. 16 to 17B schematically show an airbag unit 700 functioning as an impact absorbing member 21. An airbag apparatus 701 having the airbag unit 700 is accommodated in a case (not shown), which is accommodated in the backrest 11b of the seat 11. In a side collision of the vehicle, the airbag unit 700 is deployed (and inflated) forward from the backrest 11b, so that a pressing surface contacts the lumbar region L (buttocks) and the thorax of the occupant P. The airbag apparatus 701 is substantially located at a lower end of a seat back frame 31.

The airbag apparatus 701 has a cylindrical retainer, a gas generator, and the airbag unit 700. The gas generator is a cylindrical inflator 704 located in the retainer in this embodiment. The airbag unit 700 covers the retainer and the inflator 704. The retainer and the inflator 704 are located on an outer surface 31b of the seat back frame 31 (a side facing the door). The inflator 704 accommodates gas generating agent (not shown) for deploying and inflating the airbag unit 700. The inflator 704 has gas ports for discharging gas generated by the gas generating agent. The inflator 704 is electrically connected to a collision detector, or a sensor, for detecting a collision on a side of the vehicle body.

The airbag unit 700 includes a side airbag 705 that presses the entire side of the occupant P from a shoulder to the lumbar region L, and a lumbar region airbag 706 that presses only the buttocks of the occupant P.

The side airbag 705 has a pair of cloth sheets made of woven cloth. The cloth sheets have the same size and the same shape, and are sewn together at the periphery to form the airbag 705. Prior to inflation, the side airbag 705 is accommodated in the outer surface 31b of the seat back frame 31 (surface facing the door) in a folded state. The side airbag 705 pops out of the cushion member of the backrest 11b when inflated, so that an upper portion of side the airbag 705 is located lateral to a shoulder of the occupant, a central portion of the side airbag 705 is located lateral to the thorax, and the lower portion of the side airbag 705 is located lateral to the lumbar region. A vent hole 708 for discharging gas is formed in the side airbag 705.

The lumbar region airbag 706 has a pair of substantially circular cloth sheets made of woven cloth. The cloth sheets are sewn together at the periphery to form the lumbar region airbag 706. As shown in FIGS. 17A and 17B, the lumbar region airbag 706 is accommodated in an inner surface 31a of the seat back frame 31 (side opposite to the surface 31b facing the door) in a folded state. In this embodiment, the lumbar region airbag 706 in a deployed state has a size that covers a circle about a hip point H of the occupant P as shown in FIG. 16, which circle has a diameter D (200 mm to 250 mm). As shown in FIG. 17, the lumbar region airbag 706 pops out of the cushion member 32 of the backrest 11b when inflated, and is spread in a space defined by the seat portion 11a, the backrest 11b, the door 10 (or the seat back frame 31), and the lumbar region L (buttocks) of the occupant P.

A through hole 31c is formed in the seat back frame 31. The lumbar region airbag 706 is connected to the side airbag 705 through the through hole 31c. That is, the lumbar region airbag 706 receives gas from the inflator 704 located in the side airbag 705 through the through hole 31c.

The operation of the airbag apparatus 701 will now be described.

When the sensor detects a collision, the inflator 704 is activated and sends high-pressure gas to the airbag unit 700. This unfolds the airbag unit 700 (the side airbag 705 and the lumbar region airbag 706) and starts inflating the airbag unit 700.

When inflated, the side airbag 705 projects out of the seat 11 from the seam 35. When projecting, the side airbag 705 restrains part of the body of the occupant P including the lumbar region L and a shoulder with a high restraining force. In this embodiment, the side airbag 705 is arranged to protrude from the seam 35. However, a breakable portion for allowing the side airbag 705 to protrude may be located elsewhere.

On the other hand, when the lumbar region airbag 706 is inflated, the seat back frame 31 receives a reaction force directed toward the left side of the vehicle (if located in the right seat, a reaction force directed toward the right side), and the backrest 11b receives a backward reaction force. Therefore, the lumbar region airbag 706 starts being inflated toward the right front portion of the vehicle (in a direction indicated by a hollow arrow in FIG. 17B).

If the lumbar region airbag 706 continues being inflated, the lumbar region airbag 706 crashes through the cushion member 32 at a breakable portion 36 formed in the seat skin 34 of the cushion member 32 as shown in FIG. 17B. The breakable portion 36 is located inward of the seat back frame 31, and located at a position behind the lumbar region L of the occupant P (closer to the center of the seat 11 than the seam 35 for seaming the skin of the cushion member 32) and extends in a vertical direction.

At this time, the side airbag 705 receives a reaction force directed toward the left side of the vehicle from the lumbar region airbag 706, and the backrest 11b receives a backward reaction force. Accordingly, the pressing surface Pf of the lumbar region airbag 706, which contacts the occupant P, is formed substantially flat and inclined relative to the door (the inner wall 13) such that the lumbar region airbag 706 projects further into the passenger compartment as it approaches the rear end. The pressing surface Pf, which is pressed against the occupant P, corresponds to the inclined surface 23 of the first embodiment. Therefore, on a side of the lumbar region L of the occupant P, the pressing surface Pf is arranged as to contact the lumbar region L (buttocks) of the occupant P in a rear portion of the pelvis 111 about the ilium 121, specifically, in a section that corresponds to the pelvis 111 rearward of the acetabula 125.

That is, the lumbar region airbag 706 is inflated such that the pressing surface Pf (inclined surface 23) is inclined relative to the door (the inner wall 13) and the seat back frame 31 by a predetermined angle such that the lumbar region airbag 706 projects further into the passenger compartment as it approaches the rear end. Since the side airbag 705 and the backrest 11b receive reaction force from the lumbar region airbag 706, the lumbar region airbag 706 presses the buttocks of the occupant P toward the front and right end of the vehicle (direction indicated by hollow arrow in FIG. 17B) when inflated. The airbag apparatus 701 is located at a lower portion of the seat back frame 31, and is normally located lower than the buttocks of the occupant P. The pressing surface Pf thus protrudes further into the passenger compartment as it approaches the lower end. Since the seat portion 11a receives reaction force directed downward from the lumbar region airbag 706, which permits the lumbar region airbag 706 to press the buttocks of the occupant P upward. In this embodiment, the internal pressure of the lumbar region airbag 706 when inflated is set to be in a range from 150 kPa to 250 kPa.

In addition to the items (1) to (7) of the first embodiment, the seventh embodiment provides the following advantage.

(18) The side airbag 705 and the lumbar region airbag 706 are used together. Since the side airbag 705 is inflated on a side of the lumbar region L of the occupant P to protect the lumbar region L, the lumbar region airbag 706 and the airbag 705 give a sufficient thickness to the airbag unit 700 in a rear portion. Thus, the lumbar region airbag 706 is inflated such that the pressing surface Pf is inclined relative to the door and the seat back frame 31 by a predetermined angle, and that the lumbar region airbag 706 projects further into the passenger compartment as it approaches the rear end. Therefore, the lumbar region airbag 706 reliably contacts the lumbar region L of the occupant P in a section corresponding to a portion of the pelvis 111 rearward of the acetabula 125 or a section corresponding to the ilium 121 in the skeletal structure of the occupant P.

(19) The lumbar region airbag 706 is connected to the airbag 705 so that gas flows into the lumbar region airbag 706. Therefore, the lumbar region airbag 706 can share the same inflator 704 with the side airbag 705. That is, the number of the inflators can be minimized. This reduces the manufacture costs and facilitates the assembly.

(20) While the vent hole 708 is formed in the side airbag 705, no vent hole is formed in the lumbar region airbag 706. Therefore, the internal pressure of the lumbar region airbag 706 is higher than that of the side airbag 705. Thus, with respect to the lateral direction of the vehicle, a greater pressing force can be applied to the lumbar region P of the occupant P than to an upper portion of the torso of the passenger P.

The above described embodiments may be changed as the following further embodiments (modified embodiments).

In the second to seventh embodiments, the pressing surfaces of the airbags 200 to 700 (the surface contacting the lumbar region) are substantially flat. However, the pressing surfaces may be formed such that a central portion may be arcuately bulges with respect to the front-rear direction and/or the vertical direction. In this case, at least part of the pressing surface, preferably a center of the pressing surface, contacts a rear portion of the pelvis 111 about the ilium 121 in the skeletal structure of the occupant P. The pressing surface of this aspect of the first embodiment may be concaved in a center with respect to the traveling direction and/or the vertical direction so that the pressing surface conforms to the shape of the lumbar region L (buttocks) of the occupant P.

In the third embodiment, one end of the tether 303 is fixed to the seat back frame 31. However, the one of the tether 303 may be fixed to the seat portion 11a (specifically, to the seat cushion frame or the reclining assembly). A tether retractor mechanism may be provided at the fixed end of the tether 303. When the airbag 300 is inflated to a certain extent, the tether retractor mechanism starts retracting the tether 303.

In the fourth embodiment, the tether 502 is wound about the outer circumference of the airbag 500. Alternatively, the tether 502 may be fixed to the outer surface of the airbag 500 in a front central portion. In the third embodiment, the tether retractor mechanism 505 is provided at one end of the tether 502 to retract the tether 502. However, the tether retractor mechanism 505 may be omitted. In this case, the length of the tether 502 needs to be short so that a central portion of the airbag 500 is squeezed when inflated.

In the second and seventh embodiments, a flat reaction plate functioning as a reaction receiving member may be provided behind the backrest 11b of the seat 11, so that the reaction force applied to the airbag 200 by the backrest 11b is increased.

In the second and seventh embodiments, the airbag 200 (and lumbar region airbag 706) may be formed as a tetrahedron. Such an airbag is formed of a face of a regular triangular sheet and three isosceles triangular sheets that are sewn together to form a triangular pyramid. In this case, the airbag is arranged such that a one side (an isosceles triangle) contacts the seat portion 11a, one side (another isosceles triangle) contacts the backrest 11b, and one side (the other isosceles triangle) contacts the door 10 (and the seat back frame 31). This configuration reliably permits the pressing surface (the regular triangle) of the airbag to project further into the passenger compartment as it approaches the rear end and protrude further into the passenger compartment as it approaches the lower end.

In the third to sixth embodiments, the airbags 300, 400, 500, 600 are formed such that a surface that contacts the lumbar region L of the occupant P is substantially flat and inclined relative to the door (the inner wall 13) to protrude further into the passenger compartment as it approaches the rear end. However, these surfaces do not necessarily need to be inclined. In this case, a projection separate from the side airbag is provided on a surface of the door or the door trim facing the center of the vehicle, which surface is substantially flat and inclined by a predetermined angle relative to the door (the inner wall 13) to protrude further into the passenger compartment as it approaches the rear end. This configuration permits, using the side airbag, the lumbar region L of the occupant P to receive a pressing force in a section corresponding to a portion of the pelvis 111 rearward of the acetabula 125 or a section corresponding to the ilium 121 in the skeletal structure of the occupant P.

The third embodiment may be combined with any of the fourth to seventh embodiments. The second embodiment may be combined with any of the third to sixth embodiments. Further, the third embodiment, the seventh embodiment, and any of the fourth to sixth embodiment may be combined.

Therefore, the present examples and embodiments are to be considered as illustrative and not restrictive and the invention is not to be limited to the details given herein, but may be modified within the scope and equivalence of the appended claims.

The invention claimed is:

1. A method for protecting an occupant seated on a seat of a vehicle in a side collision of the vehicle, comprising:
   retaining a lumbar region of the occupant in a section that corresponds to a pelvis rearward of an acetabulum in the skeletal structure of the occupant seated on the seat,
   wherein the retaining of the lumbar region includes retaining the lumbar region of the occupant using an impact absorbing member,
   wherein the impact absorbing member is arranged to be located, when activated, diagonally behind the lumbar region of the occupant and near the vehicle exterior, and to overlap the lumbar region of the occupant as viewed in a traveling direction and a widthwise direction of the vehicle,
   wherein, when activated, the impact absorbing member includes an inclined surface that contacts the lumbar region of the occupant in a state inclined to protrude further into the inside of the vehicle as it approaches a rear end with respect to a traveling direction of the vehicle, such that the inclined surface is substantially parallel with an ilium of the occupant, and
   wherein, when activated, the impact absorbing member covers a portion of the lumbar region of the occupant, the portion being rearward of the greater trochanter corresponding to the ilium and outside of the rear end of the posterior-superior iliac spine of the ilium.

2. The method according to claim 1,
   wherein, when the impact absorbing member is activated in a side collision of the vehicle, the impact absorbing member contacts the lumbar region of the occupant to conform to the pelvis in a section rearward of the acetabulum.

3. The method according to claim 1, wherein the retaining of the lumbar region includes retaining the lumbar region of the occupant in a section that corresponds to the ilium in the skeletal structure of the occupant.

4. The method according to claim 3,
   wherein, when the impact absorbing member is activated in a side collision of the vehicle, the impact absorbing member initially contacts the lumbar region of the occupant in a section corresponding to the ilium.

5. The method according to claim 1,
   wherein, when the impact absorbing member is activated in a side collision of the vehicle, the impact absorbing member contacts the lumbar region of the occupant from diagonally behind the occupant.

6. The method according to claim 1, further comprising:
   transmitting load applied to the occupant in a side collision of the vehicle to an articulatio sacroiliaca of the occupant.

7. The method according to claim 1, further comprising:
   reducing a load component transmitted to a greater trochanter in load applied to the occupant in a side collision of the vehicle.

8. The method according to claim 1,
   wherein, when activated, the impact absorbing member contacts the lumbar region of the occupant in a manner inclined with respect to the vertical direction so as to conform to the vertical inclination of the ilium.

9. A structure for protecting an occupant seated on a seat of a vehicle in a side collision of the vehicle, comprising:
   an impact absorbing member located in a passenger compartment for retaining a lumbar region of the occupant seated on the seat,
   wherein the impact absorbing member is arranged to contact the lumbar region of the occupant in a section that corresponds to a pelvis rearward of an acetabulum, when the impact absorbing member is activated in a side collision of the vehicle,
   wherein the impact absorbing member is arranged to be located, when activated, diagonally behind the lumbar region of the occupant and near the vehicle exterior, and to overlap the lumbar region of the occupant as viewed in a traveling direction and a widthwise direction of the vehicle,
   wherein, when activated, the impact absorbing member includes an inclined surface that contacts the lumbar region of the occupant in a state inclined to protrude further into the inside of the vehicle as it approaches a rear end with respect to a traveling direction of the vehicle, such that the inclined surface is substantially parallel with an ilium of the occupant, and
   wherein, when activated, the impact absorbing member covers a portion of the lumbar region of the occupant, the portion being rearward of the greater trochanter corresponding to the ilium and outside of the rear end of the posterior-superior iliac spine of the ilium.

10. The structure according to claim 9, wherein the impact absorbing member is arranged to contact the lumbar region of the occupant in a section that corresponds to the ilium, when the impact absorbing member is activated in a side collision of the vehicle.

11. The structure according to claim 9, wherein the inclined surface of the impact absorbing member contacts the lumbar region of the occupant from diagonally behind the occupant, when the impact absorbing member is activated.

12. The structure according to claim 9, wherein the impact absorbing member is configured to protrude into the passenger compartment from a body of the vehicle, when the impact absorbing member is activated in a side collision of the vehicle.

13. The structure according to claim 12, wherein the impact absorbing member includes an airbag.

14. The structure according to claim 12, wherein the impact absorbing member is provided in a seat portion or backrest of the seat.

15. The structure according to claim 12, wherein the impact absorbing member is provided in a door trim or an inner panel of the vehicle.

16. The structure according to claim 9, wherein the impact absorbing member always protrudes into the passenger compartment from a body of the vehicle.

17. The structure according to claim 9, wherein the seat includes a seat portion for supporting buttocks and thighs of the occupant and a backrest contacting a back of the occupant,
wherein the backrest has flat-plate like seat back frames located at ends in a lateral direction of the vehicle, each seat back frame being arranged such that its plane is parallel to a front-rear direction and a vertical direction of the vehicle, and
wherein the impact absorbing member includes a lumbar region airbag that is inflated to a size contactable with the lumbar region of the occupant in a predetermined section in the skeletal structure of the occupant, the lumbar region airbag being located on an inside surface of a lower portion of the seat back frame located closer to the outside of the vehicle with respect to the lateral direction of the vehicle.

18. The structure according to claim 17, further comprising a reaction receiving member that receives a reaction force from the lumbar region airbag such that the lumbar region airbag is contactable with the lumbar region of the occupant in the predetermined section in the skeletal structure of the occupant.

19. The structure according to claim 18, wherein the reaction receiving member defines an inflation direction of the lumbar region airbag such that the lumbar region airbag presses the lumbar region of the occupant in a predetermined direction.

20. The structure according to claim 18, wherein the reaction receiving member receives the reaction force of the lumbar region airbag in such a manner as to prevent the lumbar region airbag from moving to a space other than a predetermined space.

21. The structure according to claim 17, wherein the impact absorbing member includes a side airbag that is inflated at a side of the seat in such manner as to protect a side of the occupant that includes at least a side of the lumbar region of the occupant, wherein the side airbag is located on an outside surface of the seat back frame that is provided with the lumbar region airbag, and wherein a through hole is formed in the seat back frame to permit gas to flow between the lumbar region airbag and the side airbag.

22. The structure according to claim 9, wherein the impact absorbing member includes a side airbag that is configured to be inflated at a side of the seat in such manner as to protect a side of the occupant that includes at least a side of the lumbar region of the occupant.

23. The structure according to claim 22, further comprising a long cord-like tether having one end fixed to the side airbag and another end fixed to the seat, wherein, when the side airbag is inflated, the tether limits movement of a lower front end of the side airbag toward the front end of the vehicle thereby increasing the thickness of a lower portion of the side airbag in the lateral direction of the vehicle, such that the lower portion of the side airbag contacts a predetermined section of the lumbar region of the occupant.

24. The structure according to claim 22, further comprising a long cord-like tether having one end fixed to the side airbag and another end fixed to the seat, wherein the tether limits movement of a lower front end of the side airbag toward the front end of the vehicle such that a thickness of a lower portion of the side airbag in the lateral direction of the vehicle is greater in a rear portion than in a front portion with respect to the front-rear direction of the vehicle.

25. The structure according to claim 22, wherein the side airbag includes an upper portion, lower portion, and a central portion located between the upper portion and the lower portion, the lower portion contacting the side of the lumbar region of the occupant, wherein an internal pressure adjusting mechanism is located in the central portion, the internal pressure adjusting mechanism causing an internal pressure of the lower portion to be higher than an internal pressure of the upper portion.

26. The structure according to claim 25, further comprising an inflator for supplying gas to the lower portion of the side airbag, a vent hole for discharging gas being formed in the upper portion of the side airbag,
wherein, with respect to the front-rear direction of the vehicle, a dimension of the central portion of the side airbag is set equal to or less than a dimension of a seat back frame provided in the backrest of the seat,
wherein the internal pressure adjusting mechanism includes a pressing portion that, prior to a side collision of the vehicle, is separated from the seat back frame by a predetermined distance, a dimension of the pressing portion being equal to or greater than the dimension of the side airbag with respect to the front-rear direction of the vehicle, and
wherein, when receiving a pressing force in the lateral direction of the vehicle, the pressing portion is bent such that the pressing portion, together with the seat back frame, holds the central portion of the airbag.

27. The structure according to claim 25, further comprising an inflator for supplying gas to the lower portion of the side airbag, a vent hole for discharging gas being formed in the upper portion of the side airbag,
wherein the internal pressure adjusting mechanism includes a long cord-like tether having ends fixed to the seat and a retractor mechanism, the tether being wound about the central portion of the side airbag, wherein, when the side airbag is inflated, the retractor mechanism retracts the tether in such a manner as to squeeze the central portion of the side airbag.

28. The structure according to claim 25, further comprising an inflator for supplying gas to the upper portion of the side airbag, a vent hole for discharging gas being formed in the upper portion of the side airbag,
wherein the internal pressure adjusting mechanism includes a flow control valve, wherein, prior to inflation of the side airbag, the flow control valve permits gas to flow from the upper portion to the lower portion of the side airbag, and wherein, when the internal pressure of the lower portion of the inflated side airbag reaches a predetermined level, the internal pressure adjusting mechanism limits the flow of gas from the lower portion to the upper portion.

29. The structure according to claim 28, wherein the flow control valve includes a plurality of sectoral pieces, wherein sides of the sectoral pieces, each of which extends from the center of the arc of the corresponding piece to one end of the arc, are sewn together, wherein the center of the arc of each sectoral piece is connected to one end of a long cord-like tether, another end of the tether being connected to an inner surface of a lower end of the side airbag, wherein the lengths of the tethers are equal to or less than a distance from the central portion to the lower end of the inflated side airbag.

30. The structure according to claim 9,
wherein, when activated, the impact absorbing member contacts the lumbar region of the occupant in a manner inclined with respect to the vertical direction so as to conform to the vertical inclination of the ilium.

* * * * *